US012736767B2

(12) United States Patent
Kasahara et al.

(10) Patent No.: US 12,736,767 B2
(45) Date of Patent: Sep. 15, 2026

(54) LENS UNIT WITH DUAL O-RING SEALING

(71) Applicant: NIDEC INSTRUMENTS CORPORATION, Nagano (JP)

(72) Inventors: Takuya Kasahara, Nagano (JP); Tadashi Komiyama, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 246 days.

(21) Appl. No.: 18/624,037

(22) Filed: Apr. 1, 2024

(65) Prior Publication Data

US 2024/0329355 A1 Oct. 3, 2024

(30) Foreign Application Priority Data

Apr. 3, 2023 (JP) ................................ 2023-059826

(51) Int. Cl.
*G02B 7/02* (2021.01)

(52) U.S. Cl.
CPC ................................... *G02B 7/021* (2013.01)

(58) Field of Classification Search
CPC ...................................................... G02B 7/021
USPC ......................................................... 359/819
See application file for complete search history.

(56) References Cited

U.S. PATENT DOCUMENTS

2006/0171046 A1* 8/2006 Recco .................... G02B 7/021 359/811
2018/0088297 A1* 3/2018 Komiyama ............ G02B 7/021
2025/0208369 A1* 6/2025 Nakajima .............. G02B 7/021

FOREIGN PATENT DOCUMENTS

JP 2021135353 9/2021

* cited by examiner

*Primary Examiner* — Sharrief I Broome
(74) *Attorney, Agent, or Firm* — JCIPRNET

(57) ABSTRACT

A lens unit has a first lens barrel including an annular accommodating portion which accommodates an outer peripheral-edge portion of a lens, a second lens barrel which accommodates a lens and is held on an inner peripheral side of the first lens barrel, and a first O-ring. The lens has an end surface facing the image side on an outer peripheral side of a lens surface. An accommodating portion includes a support surface facing the end surface of the lens on an outer peripheral side of the second lens barrel from the image side. The lens includes an annular contact portion in surface contact with the end surface of the lens on an inner peripheral side of the support surface. The first O-ring is compressed between the lens and the support surface in an optical axis direction.

5 Claims, 13 Drawing Sheets

LENS UNIT WITH DUAL O-RING SEALING

CROSS REFERENCE TO RELATED APPLICATION

This application claims the priority benefits of Japanese Application No. 2023-059826 filed Apr. 3, 2023. The entirety of the above-mentioned patent application is hereby incorporated by reference herein and made a part of this specification.

BACKGROUND

Field of the Invention

At least an embodiment of the present invention relates to a lens unit including, as lens barrels, a first lens barrel that accommodates a first lens and a second lens barrel that accommodates a second lens located adjacent to the first lens on an image side, in which the second lens barrel is held by the first lens barrel.

Description of the Related Documents

A lens unit in which a first lens located closest to an object side and a second lens located adjacent to the first lens on an image side are accommodated in a single lens barrel is described in Japanese Unexamined Patent Publication No. 2021-135353. The lens unit in the aforementioned document includes an O-ring disposed between the first lens and the lens barrel. The O-ring is compressed in a radial direction between the first lens and an inner peripheral surface of the first lens barrel and seals a space between them liquid-tightly. As a result, the O-ring prevents intrusion of water or the like into a space between the first lens and the second lens through a space between the lens barrel and the first lens. Further, in the lens unit of aforementioned document, a surface on an image side of the first lens and a surface on an object side of the second lens are brought into contact with each other, and intrusion of water vapor into the space between the first lens and the second lens is prevented. Here, if water vapor intrudes into the space between the first lens and the second lens, fogging occurs on a lens surface on the image side of the first lens and a lens surface on the object side of the second lens.

As the lens barrel, a lens unit including a first lens barrel that accommodates a first lens and a second lens barrel that accommodates a second lens located on an image side of the first lens, in which the second lens barrel is held by the first lens barrel, is considered. Even in the lens unit as above, there is a problem that water vapor intrudes into the space between the first lens and the second lens.

In view of the aforementioned problems, an object of at least an embodiment of the present invention is to provide a lens unit capable of preventing or suppressing intrusion of water vapor into a space between the first lens and the second lens when the lens unit includes the first lens barrel that accommodates the first lens and the second lens barrel that accommodates the second lens located on the image side of the first lens.

SUMMARY

In order to solve the above problems, a lens unit of at least an embodiment of the present invention has a first lens and a second lens disposed in this order from an object side to an image side, a first lens barrel including an annular accommodating portion which accommodates an outer peripheral-edge portion of the first lens, a second lens barrel which accommodates the second lens and is held on an inner peripheral side of the first lens barrel, and a first O-ring, in which the first lens has an end surface facing the image side on an outer peripheral side of a lens surface, the accommodating portion includes a peripheral wall surface located on an outer peripheral side of the second lens barrel and facing the first lens from an outer side in a radial direction, a support surface extending from an end on the image side of the peripheral wall surface to an inner peripheral side and facing the end surface from the image side, a caulking portion which is brought into contact with the first lens from the object side at a position overlapping the support surface when viewed from an optical axis direction along an optical axis of the first lens, the second lens includes an annular contact portion which is in surface contact with the end surface of the first lens on the inner peripheral side of the support surface, and the first O-ring is compressed between the first lens and the peripheral wall surface or between the first lens and the support surface.

According to at least an embodiment of the present invention, the first O-ring is disposed in a compressed state between the first lens and the inner wall surface (the peripheral wall surface or the support surface) of the accommodating portion of the first lens in the first lens barrel. As a result, the first O-ring can prevent intrusion of water or the like into a space between the first lens and the second lens from the object side through a space between the inner wall surface of the first lens barrel and the first lens. Further, in at least an embodiment of the present invention, the second lens held by the second lens barrel includes an annular contact portion which is in surface contact with an end surface of the first lens accommodated in the first lens barrel. Therefore, even if the first lens and the second lens are held in different lens barrels, the intrusion of water vapor into the space between the first lens and the second lens can be prevented. Thus, occurrence of fogging on a lens surface on the image side of the first lens and a lens surface on the object side of the second lens can be prevented or suppressed.

In at least an embodiment of the present invention, the first O-ring may be compressed in the optical axis direction between the end surface and the support surface. As a result, the first O-ring can liquid-tightly seal a space between the end surface of the first lens and the support surface of the first lens barrel. Further, when the first O-ring is compressed in the optical axis direction, the first O-ring urges the first lens toward the caulking portion. As a result, since it is possible to suppress formation of a gap between the first lens and the caulking portion, the intrusion into the space between the first lens and the second lens from the object side through the space between the inner wall surface of the first lens barrel and the first lens can be prevented more easily.

In at least an embodiment of the present invention, it may be so configured by having a third lens disposed on the image side of the second lens and a second O-ring disposed between the second lens and the third lens, in which the second lens barrel accommodates the third lens and the second O-ring, includes an annular second caulking portion which is bent from a distal end part on the object side to an inner peripheral side and is brought into contact with an outer peripheral-edge portion of the second lens from the object side, and includes a first stepped portion on an inner peripheral surface, the first stepped portion includes an annular first seating surface facing the object side at a position overlapping the caulking portion when viewed from the optical axis direction and an inner peripheral-surface portion extending from an end on an inner peripheral side of the annular first seating surface to the image side, the outer peripheral-edge portion of the second lens is located between the caulking portion and the annular first seating surface, the third lens is supported from the image side at a predetermined position in the optical axis direction, and the second O-ring is compressed in the optical axis direction at a position adjacent to the inner peripheral-surface portion in the radial direction and exerts an urging force to urge the third lens toward the object side and to urge the third lens toward the image side. With this configuration, even when the second caulking portion provided on the second lens barrel lifts on the object side, the state where the second lens is in contact with the second caulking portion is maintained by the urging force of the second O-ring. Further, the urging force of the second O-ring maintains a state in which the annular contact portion of the second lens held by the second lens barrel is in surface contact with the end surface of the first lens accommodated in the first lens barrel. Therefore, even if the first lens and the second lens are held in different lens barrels, the intrusion of water vapor into the space between the first lens and the second lens can be prevented.

In at least an embodiment of the present invention, it may be so configured by having a laminated body including a plurality of lenses laminated in the optical axis direction, in which the second lens barrel includes a second stepped portion closer to an image side than the first stepped portion on an inner peripheral surface, the second stepped portion includes a second seating surface facing the object side, the laminated body is accommodated in the lens barrel in a state of being placed on the second seating surface, the third lens is laminated on the object side of the laminated body and is supported from the image side by the laminated body, the second lens is laminated on the object side of the third lens and is supported at a predetermined position in the optical axis direction, and the second O-ring and the second seating surface overlap each other when viewed from the optical axis direction. With this configuration, it is easy to press the laminated body against the second seating surface via the third lens by the urging force of the second O-ring.

According to at least an embodiment of the present invention, the first O-ring is disposed in a compressed state between the first lens and the inner wall surface of the accommodating portion of the first lens in the first lens barrel. As a result, the first O-ring can prevent intrusion of water or the like into a space between the first lens and the second lens from the object side through a space between the inner wall surface of the first lens barrel and the first lens. Further, in at least an embodiment of the present invention, the second lens held by the second lens barrel includes an annular contact portion which is in surface contact with an end surface of the first lens accommodated in the first lens barrel. Therefore, even if the first lens and the second lens are held in different lens barrels, the intrusion of water vapor into the space between the first lens and the second lens can be prevented. Thus, occurrence of fogging on a lens surface on the image side of the first lens and a lens surface on the object side of the second lens can be prevented or suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, embodiments of a lens unit to which at least an embodiment of the present invention is applied will be described with reference to the drawings.

Optical System

Figure 1:
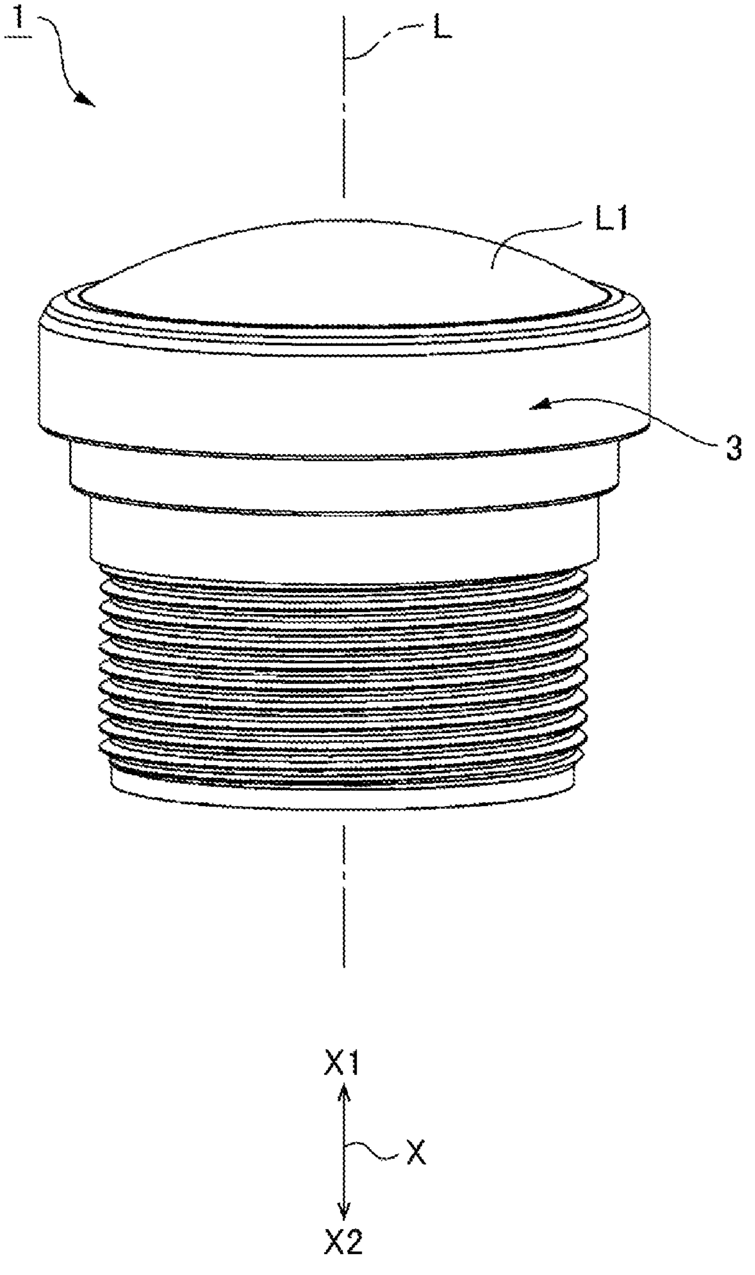
FIG. 1 is an appearance perspective view of a lens unit to which at least an embodiment of the present invention is applied.
Figure 2:
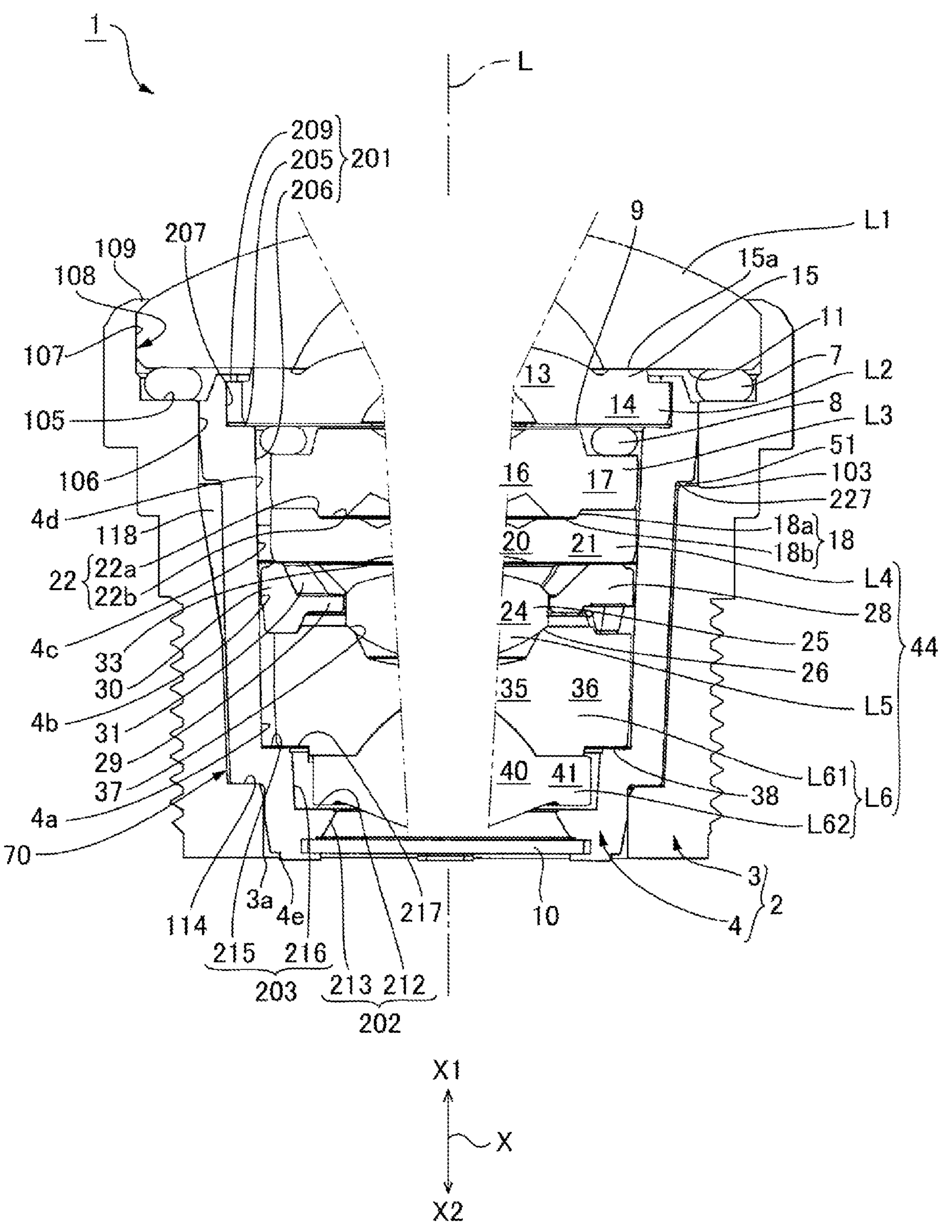
FIG. 2 is a cross-sectional view of the lens unit.
Figure 3:
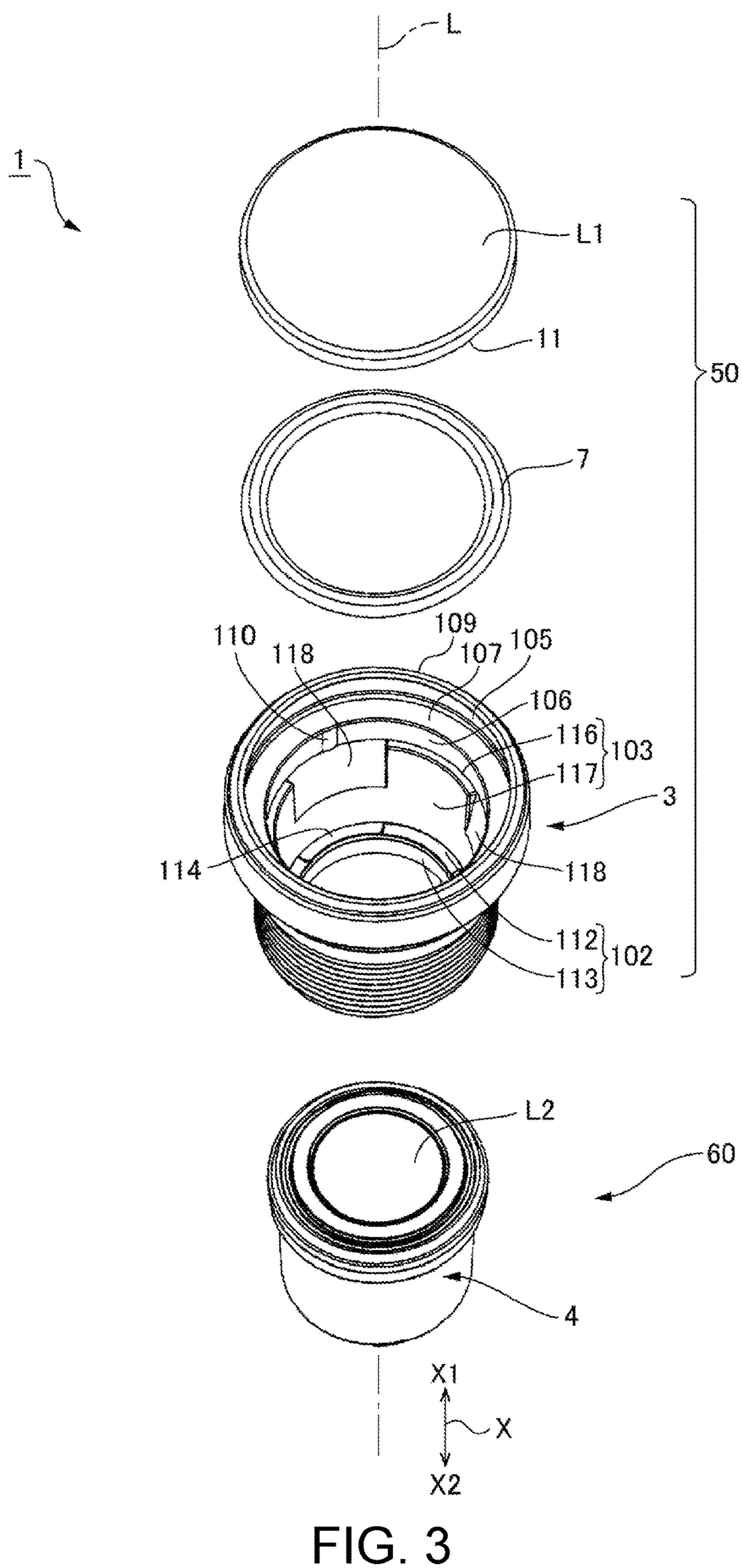
FIG. 3 is an exploded perspective view of the lens unit.
Figure 4:
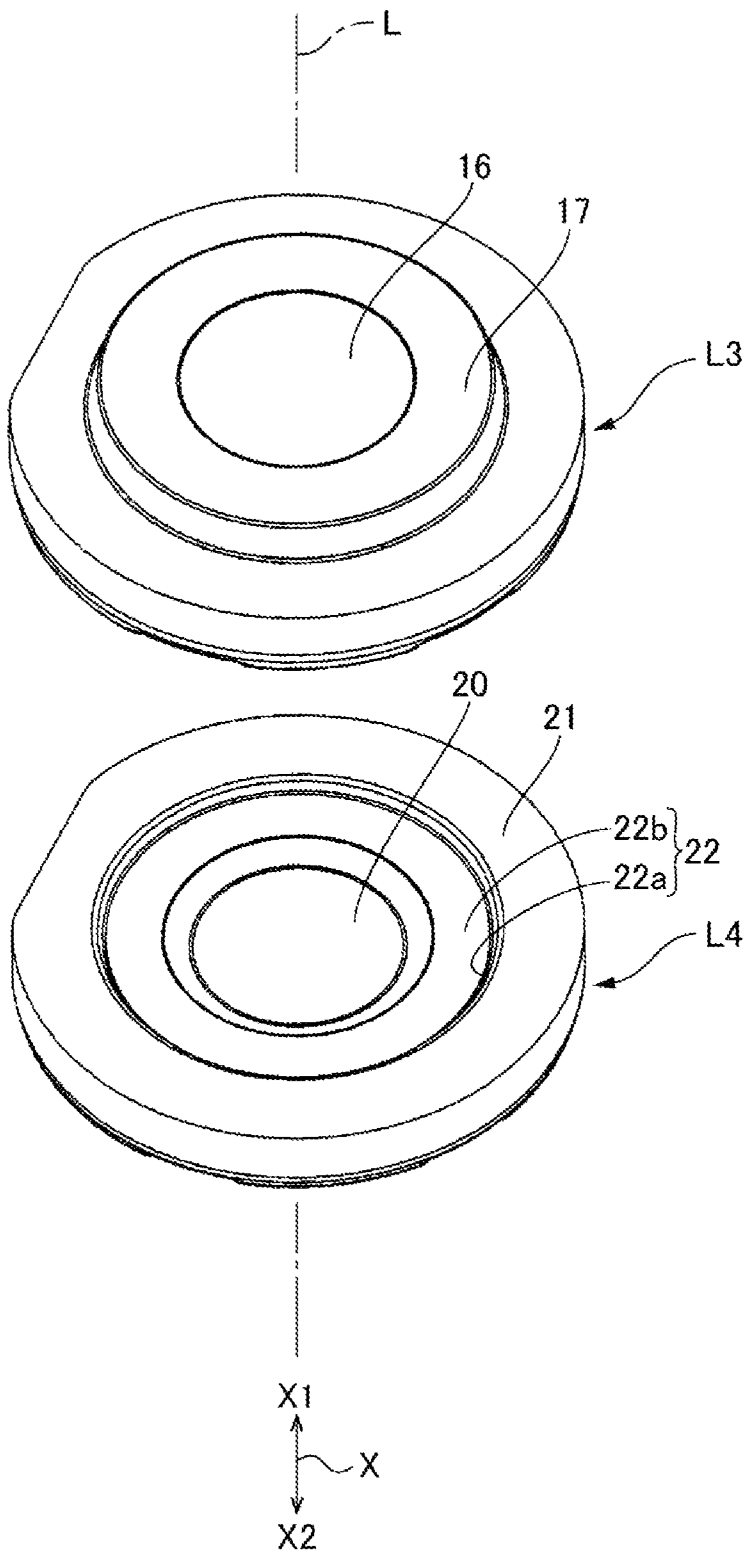
FIG. 4 is an exploded perspective view of a lens L3 and a lens L4 when viewed from an object side.
Figure 5:
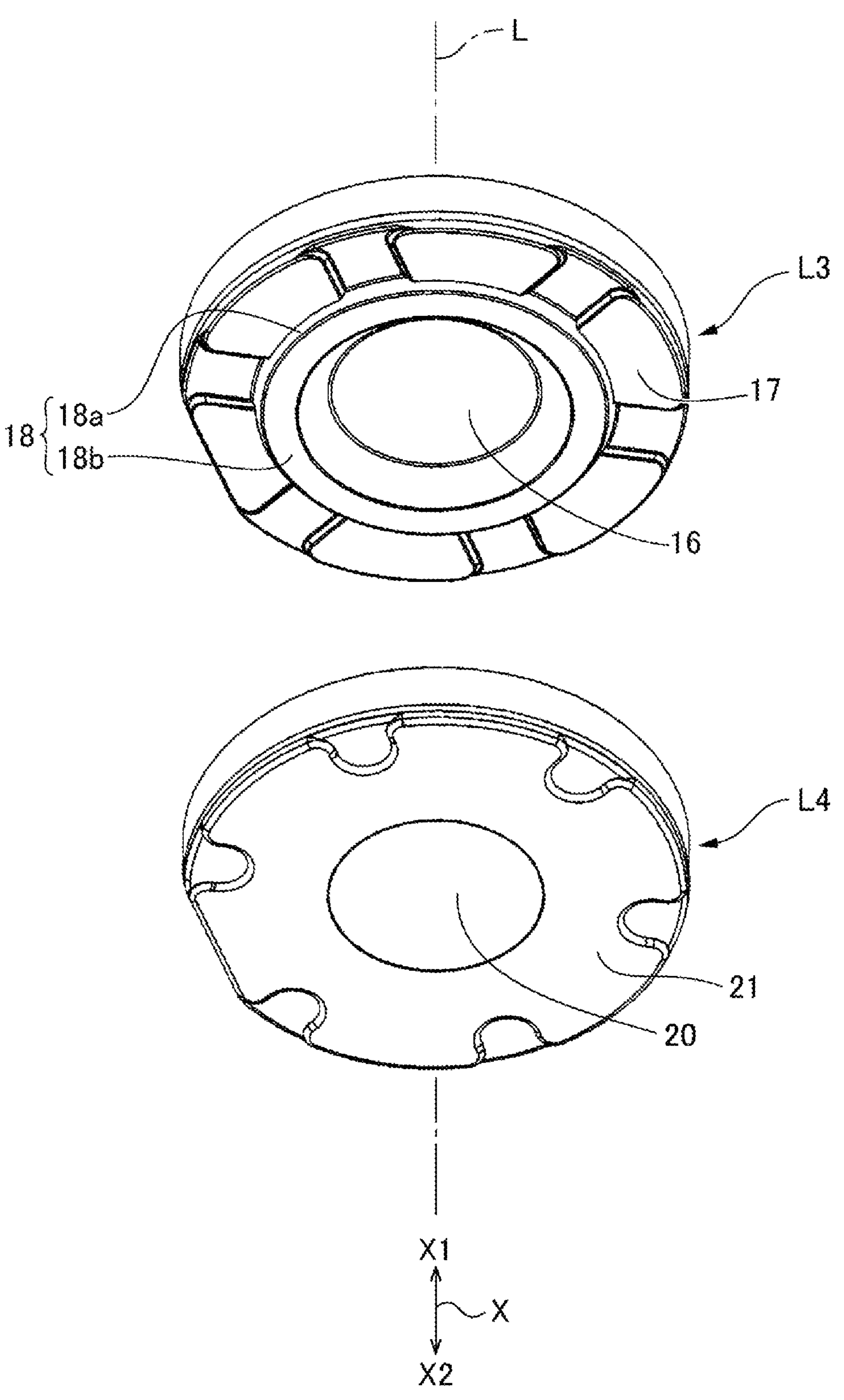
FIG. 5 is an exploded perspective view of the lens L3 and the lens L4 when viewed from an image side.
Figure 6:
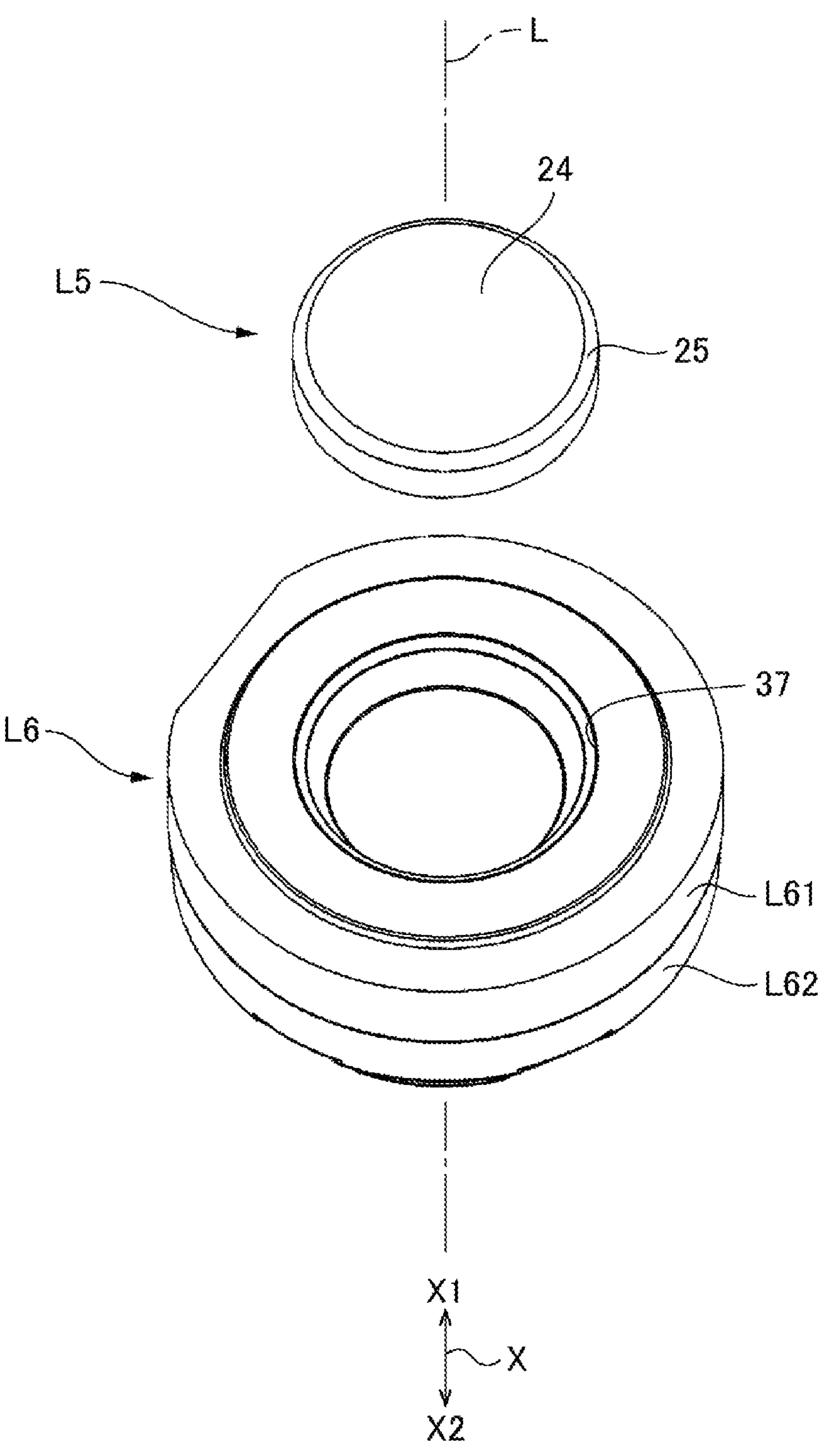
FIG. 6 is an exploded perspective view of a lens L5 and a lens L6 when viewed from the object side.
Figure 7:
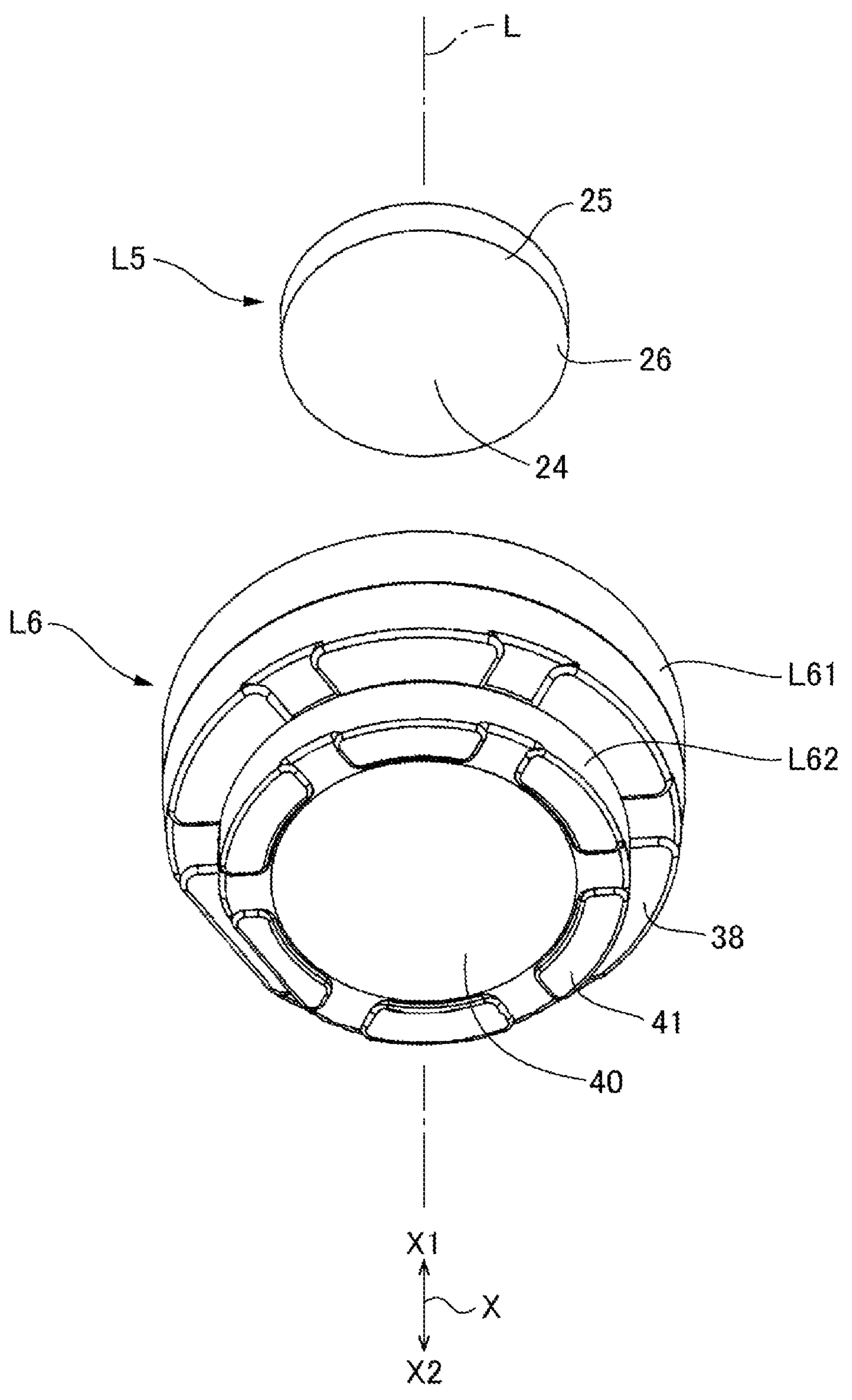
FIG. 7 is an exploded perspective view of the lens L5 and the lens L6 when viewed from the image side.
Figure 8:
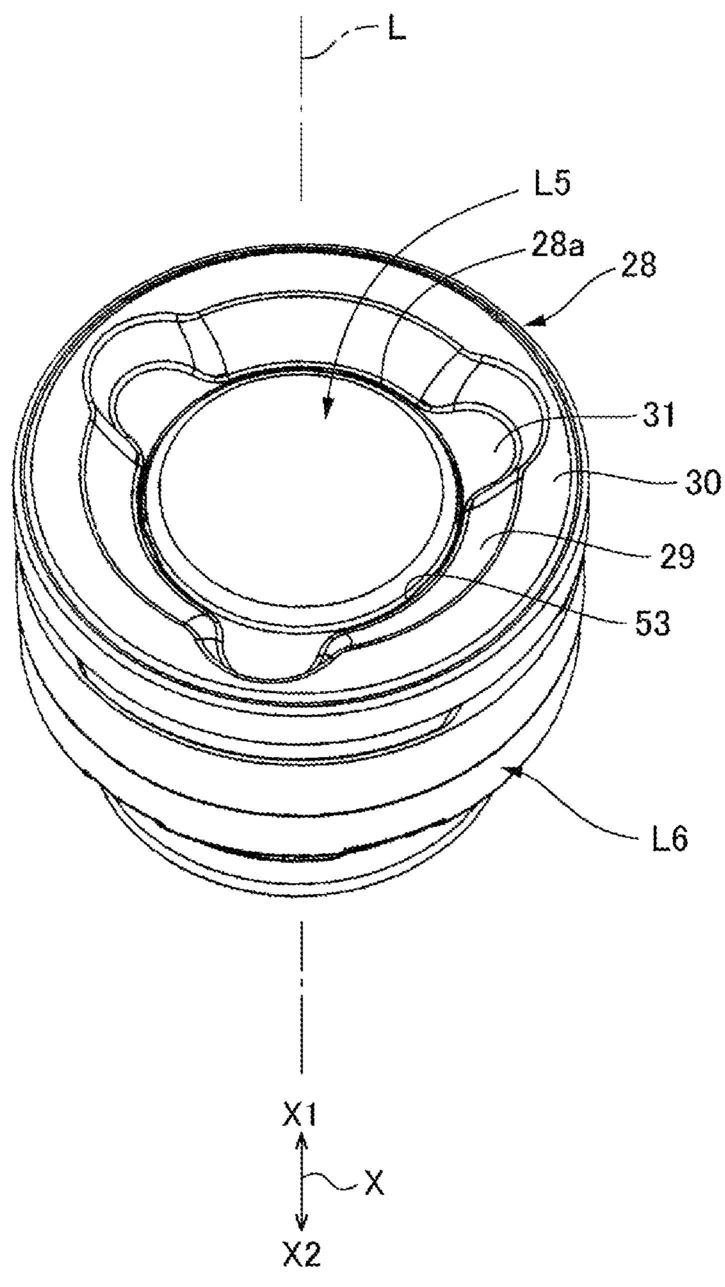
FIG. 8 is a perspective view of a holder, the lens L5, and the lens L6.

FIG. 1 is an appearance perspective view of a lens unit to which at least an embodiment of the present invention is applied. FIG. 2 is a cross-sectional view of the lens unit. FIG. 3 is an exploded perspective view of the lens unit. FIG. 4 is an exploded perspective view of a lens L3 and a lens L4 when viewed from an object side. FIG. 5 is an exploded perspective view of the lens L3 and the lens L4 when viewed from an image side. FIG. 6 is an exploded perspective view of a lens L5 and a lens L6 when viewed from the object side. FIG. 7 is an exploded perspective view of the lens L5 and the lens L6 when viewed from the image side. FIG. 8 is a perspective view of a holder, the lens L5, and the lens L6. It is to be noted that, in FIG. 2, a shape of each lens in a region (around the optical axis) between two two-dot chain lines is omitted.

A lens unit 1 of this Embodiment shown in FIG. 1 is used in an image pickup apparatus mounted on an automobile or a surveillance camera. As shown in FIG. 2, the lens unit 1 includes a lens L1, a lens L2, a lens L3, a lens L4, a lens L5, and a lens L6 in this order from the object side to the image side. The lens L6 is a cemented lens and includes an object-side lens L61 and an image-side lens L62 in this order from the object side to the image side. Further, the lens unit 1 includes, as a lens barrel 2, a first lens barrel 3 and a second lens barrel 4 held on an inner peripheral side of the first lens barrel 3. The lens L1 is accommodated in the first lens barrel 3. The lens L2 to the lens L6 are accommodated in the second lens barrel 4. The second lens barrel 4 is held on the inner peripheral side of the first lens barrel 3.

As shown in FIG. 3, the lens L1 and the first lens barrel 3 constitute a first unit 50. The lens L2 to the lens L6 and the second lens barrel 4 constitute a second unit 60. Hereinafter, a direction along the optical axis L of the lens L1 is referred to as an optical axis direction X. The optical axis L of the lens L1 is the optical axis L of the lens unit 1. An object side X1 in the optical axis direction X is a side where the lens L1 is located, and an image side X2 is a side where the lens L6 is located.

As shown in FIG. 2, the lens L1 has an outer diameter dimension larger than those of the lens L2 to the lens L6. In this Embodiment, the lens L1 is made of glass. The lens L1 is a meniscus-shaped lens having a convex shape on the object side X1. The lens L1 includes an annular end surface 11 spreading in a direction orthogonal to the optical axis L on the outer peripheral side of the lens surface on the image side X2. On the image side X2 of the end surface 11 of the lens L1, a first O-ring 7 is disposed.

The lens L2 is made of a resin. The lens L2 includes a lens main-body portion 13 having a lens surface and a flange portion 14 surrounding the lens main-body portion 13. The lens L2 is a meniscus lens having a convex shape on the object side X1. An annular protrusion 15 protruding toward the object side X1 is provided on an end surface of the object side X1 of the flange portion 14. A distal end of the annular protrusion 15 is an annular contact portion 15*a* in surface contact with the end surface of the lens L1.

As shown in FIGS. 2, 4, and 5, the lens L3 is made of a resin. The lens L3 includes a lens main-body portion 16 having a lens surface and a flange portion 17 surrounding the lens main-body portion 16. The lens L3 is a meniscus lens having a convex shape on the image side X2. As shown in FIG. 5, an annular fitting portion 18 protruding toward the object side X1 is provided on the end surface of the image side X2 of the flange portion 17. The fitting portion 18 includes a fitting-portion tapered surface 18*a* surrounding the optical axis L and inclined to the inner peripheral side toward the image side X2 and a fitting-portion end surface 18*b* extending perpendicularly to the optical axis L toward the inner peripheral side from an end on the image side X2 of the fitting-portion tapered surface 18*a*.

Here, as shown in FIG. 2, an elastic member is disposed between the lens L2 and the lens L3 in the optical axis direction X. The elastic member is a second O-ring 8. The second O-ring 8 is compressed in the optical axis direction X between the flange portion 14 of the lens L2 and the flange portion 17 of the lens L3. In this Embodiment, a light shielding sheet 9 made of a resin is disposed between the lens L1 and the lens L2 in the optical axis direction X. The light shielding sheet 9 has an annular shape. The second O-ring 8 is located between the light shielding sheet 9 and the lens L3.

The lens L4 is made of a resin. As shown in FIGS. 2, 4, and 5, the lens L4 includes a lens main-body portion 20 having a lens surface and a flange portion 21 surrounding the lens main-body portion 20. The lens surface on the object side X1 of the lens main-body portion 20 of the lens L4 is a curved surface protruding toward the object side X1. The lens surface on the object side X1 of the lens main-body portion 20 includes a curved surface part protruding toward the image side X2 at a center.

As shown in FIG. 4, a fitted portion 22 in which the fitting portion 18 of the lens L3 is fitted is provided on the end surface on the object side X1 of the flange portion 21. The fitting portion 18 includes a fitted-portion tapered surface 22*a* surrounding the optical axis L and inclined to the inner peripheral side toward the image side X2 and a fitted-portion end surface 22*b* extending perpendicularly to the optical axis L toward the inner peripheral side from an end on the image side X2 of the fitted-portion tapered surface 22*a*. As shown in FIG. 2, the fitting-portion tapered surface 18*a* of the lens L3 and the fitted-portion tapered surface 22*a* of the lens L4 are in surface contact with each other. The fitting-portion end surface 18*b* of the lens L3 and the fitted-portion end surface 22*b* of the lens L4 are separated in the optical axis direction X. In this Embodiment, the end surface on the image side X2 of the outer peripheral-side portion of the fitting portion 18 in the flange portion 17 of the lens L3 and the end surface on the object side X1 of the outer peripheral-side portion of the fitted portion 22 in the flange portion 21 of the lens L4 are in contact with each other in the optical axis direction X. As a result, the lens L3 is placed on the lens L4, and the lens L3 is positioned in the optical axis direction X.

The lens L5 is made of glass. As shown in FIG. 2, the lens L5 has an outer diameter dimension smaller than those of the lens L2, the lens L3, the lens L4, and the lens L6. The lens L5 includes a lens main-body portion 24 having a lens surface and a flange portion 25 surrounding the lens main-body portion 24. The lens L5 is a biconvex lens. As shown in FIGS. 2 and 7, the image side X2 of the flange portion 25 is also a contact portion 26 that comes into contact with the lens L6 from the object side X1. A cross section of the contact portion 26 cut along the optical axis L is an arc curved to the object side X1 toward the outer peripheral side. As shown in FIG. 7, the surface on the image side X2 of the contact portion 26 continues to the outer peripheral end of a lens surface 24*a* on the image side X2 of the lens main-body portion 24 without a gap.

As shown in FIG. 2, a holder 28 made of a resin is disposed on the outer side in the radial direction the lens L5. As shown in FIG. 8, the holder 28 has an annular shape. The holder 28 includes a center portion 29 adjacent to the lens L5 with a clearance 28*a* in the radial direction and an outer peripheral portion 30 thicker in the optical axis direction X than the center portion 29 on the outer peripheral side of the center portion 29. A surface on the object side X1 of the center portion 29 is inclined to the image side X2 from the outer peripheral portion 30 toward the inner peripheral side. At three spots in the circumferential direction of the center portion 29 and the outer peripheral portion 30, notch portions 31 cut out from the object side X1 and the inner peripheral side are provided. A bottom surface (surface facing the object side X1) of the notch portion 31 continues to an end edge on the inner peripheral side of the center portion 29.

Here, a diaphragm 33 is disposed between the lens L4 and the lens L5. The diaphragm 33 is an annular sheet, is sandwiched between the lens L4 and the holder 28, and is supported at a predetermined position in the optical axis direction X.

The lens L6 is made of a resin. That is, both the object-side lens L61 and the image-side lens L62 are made of resins. As shown in FIG. 2, the object-side lens L61 includes a lens main-body portion 35 having a lens surface and a flange portion 36 surrounding the lens main-body portion 35. The lens surface on the object side X1 of the object-side lens L61 is a curved surface that curves toward the image side X2, and the lens surface on the image side X2 is a curved surface that is recessed toward the object side X1.

As shown in FIG. 6, the flange portion 36 of the object-side lens L61 includes a contacted portion 37 with which the contact portion 26 of the lens L5 comes into contact on the object side X1. The contacted portion 37 is a tapered surface extending to the object side X1 toward the outer peripheral side. The contact portion 26 and the contacted portion 37 are in linear contact. A contact line M along which the contact portion 26 and the contacted portion 37 come into contact with each other has an annular shape coaxial with the optical axis L and is located on a virtual perpendicular plane S perpendicular to the optical axis L (see FIG. 12 to be described later). Further, the flange portion 36 of the object-side lens L61 has an annular end surface 38 perpendicular to the optical axis L on the image side X2.

The image-side lens L62 includes a lens main-body portion 40 having a lens surface and a flange portion 41 surrounding the lens main-body portion 40. The lens surface on the object side X1 of the image-side lens L62 is a curved surface that protrudes toward the object side X1, and the lens surface on the image side X2 is a curved surface that protrudes toward the object side X1. The image-side lens L62 is fixed to the object-side lens L61. The outer diameter dimension of the image-side lens L62 is smaller than the outer diameter dimension of the object-side lens L61. Therefore, as shown in FIG. 7, when viewed from the image side X2, the flange portion 36 of the object-side lens L61 has a portion protruding from the image-side lens L62 to the outer peripheral side.

Here, as shown in FIG. 2, the lens L5 is stacked on the lens L6. Further, the lens L4 is stacked on the lens L6 via the holder 28. The lens L4, the holder 28, the lens L5, and the lens L6 constitute a laminated body 44. The lens L3 is stacked on the lens L4. That is, the lens L3 is stacked on the laminated body 44. Further, a plate-shaped cover 10 is disposed on the image side X2 of the lens L6.

Lens Barrel

As shown in FIGS. 2 and 3, the lens unit 1 includes, as the lens barrel 2, the first lens barrel 3 and the second lens barrel 4 held on the inner peripheral side of the first lens barrel 3. The first lens barrel 3 and the second lens barrel 4 are both made of a resin. Further, the first lens barrel 3 and the second lens barrel 4 are resin-injection molded products molded by injecting a resin into a mold. The lens L1 is accommodated in the first lens barrel 3. The lenses L2 to L6 and the holder 28 are accommodated in the second lens barrel 4. The second lens barrel 4 is held on the inner peripheral side of the first lens barrel 3.

First Lens Barrel and Lens L1

Figure 9:
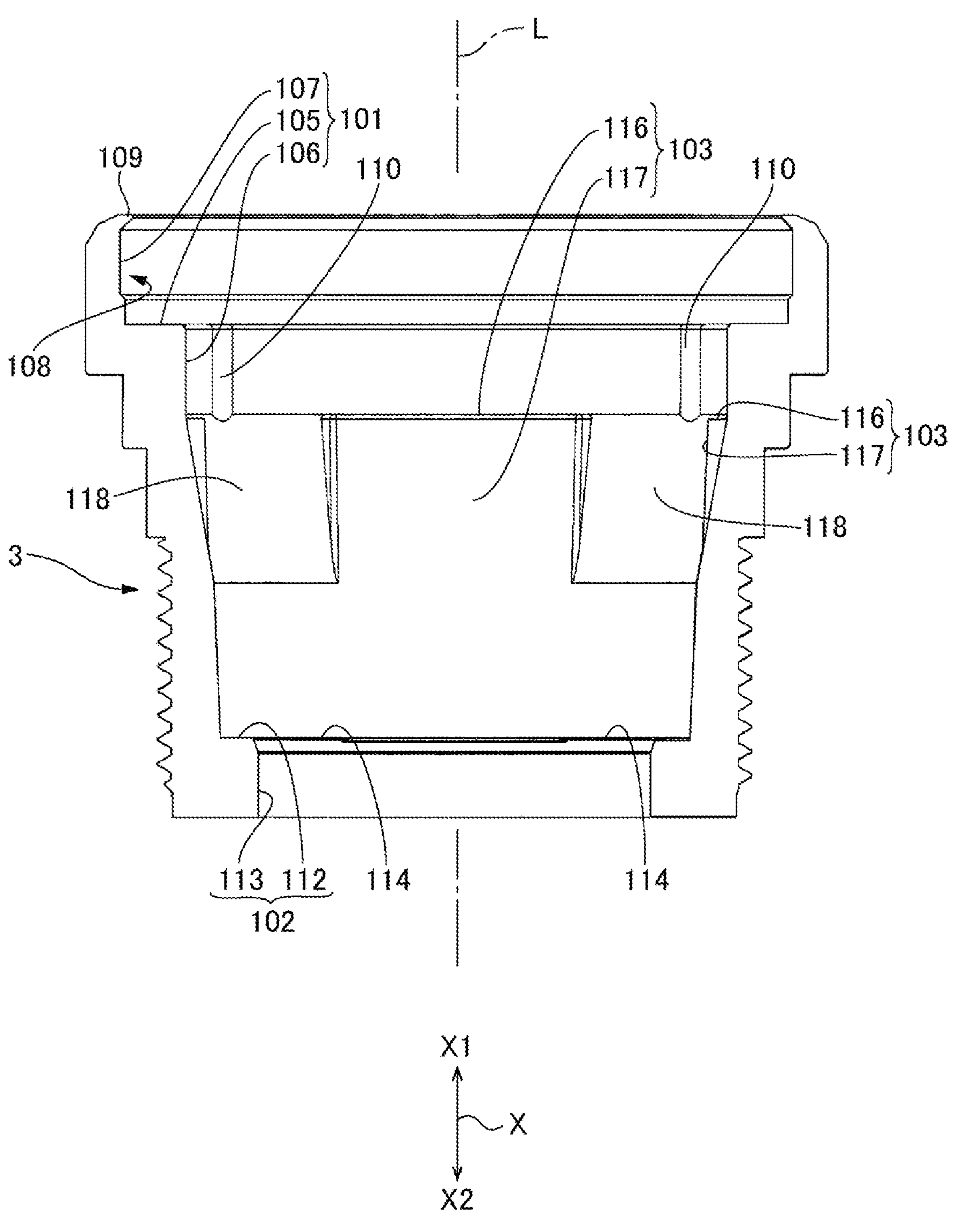
FIG. 9 is a sectional view of a first lens barrel.

FIG. 9 is a sectional view of the first lens barrel 3. The first lens barrel 3 has a cylindrical shape and is located on the outer peripheral side of the lens L2, the lens L3, the lens L4, the holder 28, the lens L5, the lens L6, and the second lens barrel 4. As shown in FIGS. 3 and 9, the first lens barrel 3 includes an object-side stepped portion 101 at an end part on the object side X1 of the inner peripheral surface, and an image-side stepped portion 102 at an end part of the image side X2. Further, the first lens barrel 3 includes an intermediate stepped portion 103 between the object-side stepped portion 101 and the image-side stepped portion 102 in the optical axis direction X of the inner peripheral surface.

The object-side stepped portion 101 includes a support surface 105 facing the object side X1, an annular wall surface 106 extending from an end on an inner peripheral side of the support surface 105 toward the image side X2 and facing radially inward, and a peripheral wall surface 107 extending from an end on an outer peripheral side of the support surface 105 toward the object side X1. In the first lens barrel 3, the object side X1 of the object-side stepped portion 101 is an accommodating portion 108 that accommodates an outer peripheral-edge portion of the lens L1. It is to be noted that the second lens barrel 4 is held on the inner peripheral side of the annular wall surface 106.

The accommodating portion 108 includes the peripheral wall surface 107, the support surface 105, and a caulking portion 109. As shown in FIG. 2, the peripheral wall surface 107 faces the lens L1 from the outer side in the radial direction. The support surface 105 faces the end surface 11 of the lens L1 from the image side X2. The caulking portion 109 is brought into contact with the lens L1 from the object side X1 at a position overlapping the support surface 105 when viewed from the optical axis direction X along the optical axis L of the lens L1. The caulking portion 109 is a plastically deformed portion provided by thermal caulking or the like in which an end part of the object side X1 of the first lens barrel 3 is bent toward the inner peripheral side. Here, the outer peripheral-edge portion of the lens L1 is disposed between the support surface 105 and the caulking portion 109. The first O-ring 7 is disposed between the end surface on the image side X2 of the lens L1 and the support surface 105, and is compressed in the optical axis direction X.

As shown in FIG. 3, on the annular wall surface 106, object-side protrusions 110 protruding radially inward are provided at a plurality of spots in the circumferential direction. In this Embodiment, the object-side protrusions 110 are provided at three spots in the circumferential direction at equal angular intervals. The object-side protrusion 110 is an object-side positioning portion for positioning the second lens barrel 4 in the radial direction.

Figure 10:
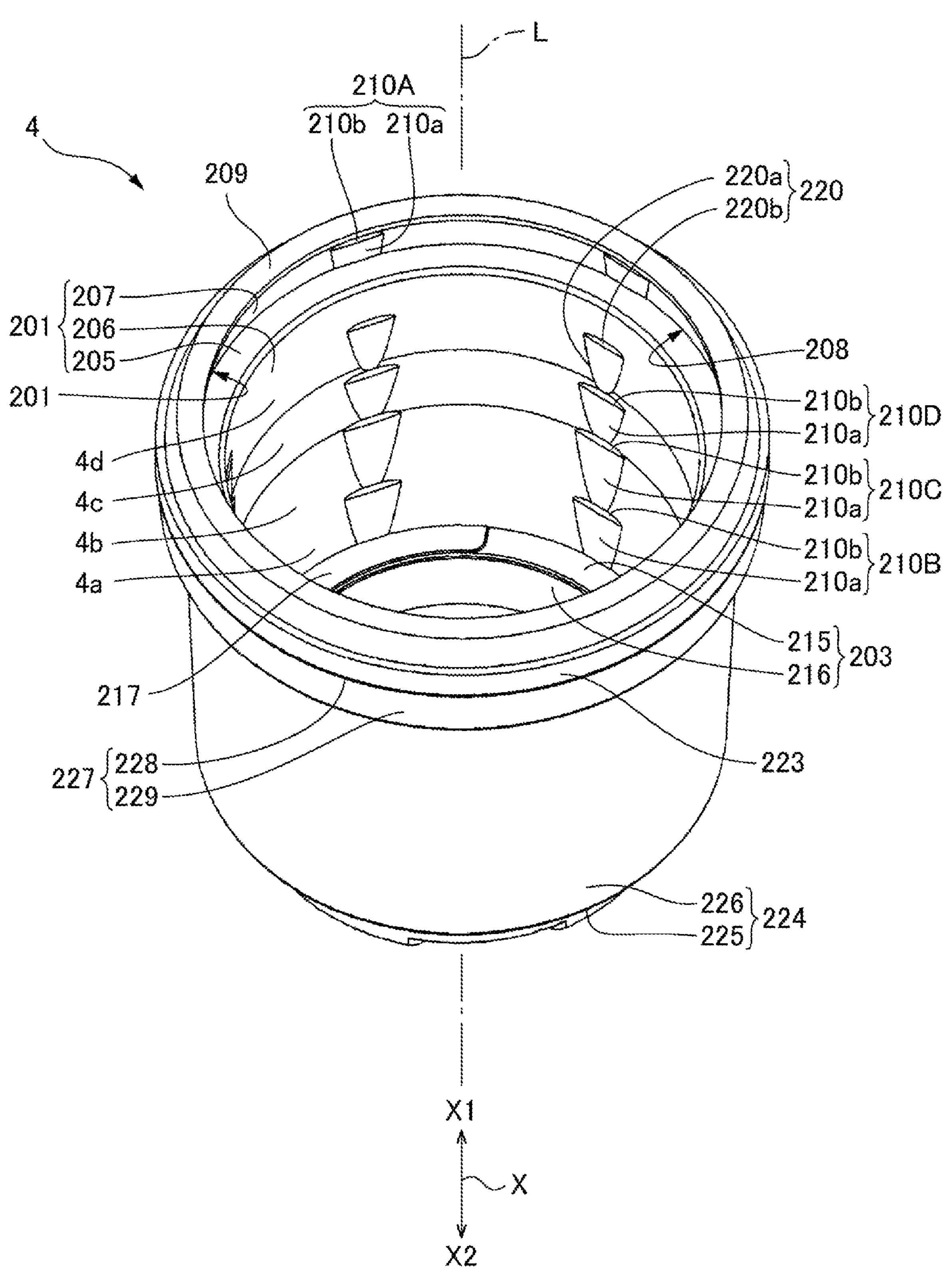
FIG. 10 is a perspective view of a second lens barrel viewed from the object side.

As shown in FIGS. 3 and 10, the image-side stepped portion 102 includes an annular image-side end surface 112 facing the object side X1, and an annular image-side inner-wall surface 113 extending from an end on the inner peripheral side of the image-side end surface 112 to the image side X2 and reaching an end on the image-side on the image side X2 of the first lens barrel 3. On the image-side end surface 112, a plurality of ribs 114 that protrude toward the object side X1 and extend in an arc shape in the circumferential direction are provided. In this Embodiment, the ribs 114 are provided at three spots in the circumferential direction at equal angular intervals. The rib 114 is an image-side positioning portion for positioning the second lens barrel 4 in the optical axis direction X.

The intermediate stepped portion 103 includes an annular stepped-portion end surface 116 facing the object side X1 and an annular stepped-portion wall surface 117 extending from an end on the inner peripheral side of the stepped-portion end surface 116 to the image side X2. In this Embodiment, in the intermediate stepped portion 103, notch grooves 118 which extend in the optical axis direction X and divide the stepped-portion end surface 116 and the stepped-portion wall surface 117 in the circumferential direction are provided at a plurality of spots in the circumferential direction. In this Embodiment, the notch grooves 118 are provided at three spots in the circumferential direction at equal angular intervals. Therefore, the intermediate stepped portion 103 is divided into three in the circumferential direction by the notch grooves 118. A bottom surface (surface facing the inner peripheral side) of the notch groove 118 is a tapered surface, and the inner diameter dimension becomes smaller toward the image side X2. As shown in FIG. 2, the bottom surface of the notch groove 118 continues to an inner peripheral-surface portion extending from the end on the outer peripheral side of the image-side end surface 112 of the image-side stepped portion 102 to the object side X1 on the inner peripheral surface of the first lens barrel 3.

Here, as shown in FIG. 3, the notch groove 118 is provided at the same angular position as the rib 114 of the image-side stepped portion 102. Further, the notch groove 118 is provided at the same angular position as that of the object-side protrusion 110 of the object-side stepped portion 101. It is to be noted that, when the first lens barrel 3 and the second lens barrel 4 disposed on the inner peripheral side of the first lens barrel 3 are connected to each other, an adhesive is applied to each of the stepped-portion end surfaces 116 of the intermediate stepped portion 103 divided into three. As a result, a lens-barrel connecting adhesive-layer 51 is provided on the stepped-portion end surface 116 and the stepped-portion wall surface 117.

Second Lens Barrel and Lens L2 to Lens L6

Figure 11:
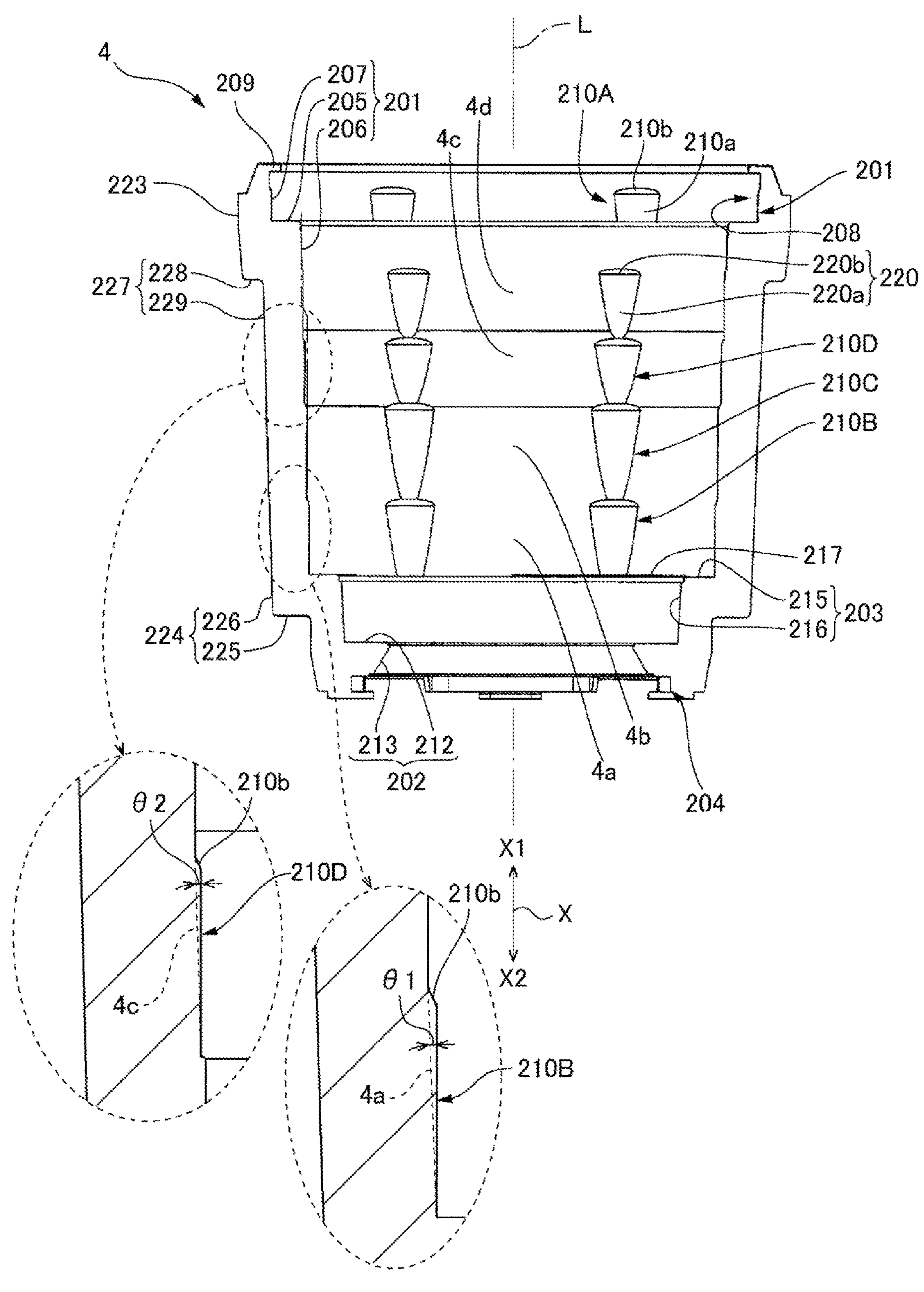
FIG. 11 is a sectional view of the second lens barrel.

FIG. 10 is a perspective view of the second lens barrel 4 viewed from the object side. FIG. 11 is a sectional view of the second lens barrel 4. A region surrounded by a chain line in FIG. 11 is a partially enlarged view of a periphery of a fitting protrusion 210. The second lens barrel 4 accommodates the lens L2, the lens L3, the lens L4, the lens L5, the holder 28, and the lens L6 on the inner peripheral side.

As shown in FIGS. 10 and 11, the second lens barrel 4 includes an object-side stepped portion 201 at an end part on the object side X1 of the inner peripheral surface. Further, the second lens barrel 4 includes an image-side stepped portion 202 at an end part on the image side X2. Further, the second lens barrel 4 includes a positioning stepped portion 203 at a position between the object-side stepped portion 201 and the image-side stepped portion 202 and closer to the image-side stepped portion 202 than the object-side stepped portion 201. Further, the second lens barrel 4 includes a cover holding portion 204 that holds the cover 10 at an end part of the object side X1.

As shown in FIG. 11, the object-side stepped portion 201 includes a seating surface 205 facing the object side X1, an annular wall surface 206 extending from an end on the inner peripheral side of the seating surface 205 toward the image side X2, and a peripheral wall surface 207 extending from an end on the outer peripheral side of the seating surface 205 toward the object side X1. The annular wall surface 206 is a tapered surface whose inner diameter dimension becomes larger toward the object side X1. In the second lens barrel 4, the object side X1 of the object-side stepped portion 201 is an accommodating portion 208 that accommodates the outer peripheral-edge portion of the lens L2.

The accommodating portion 208 includes the peripheral wall surface 207, the seating surface 205, and a caulking portion 209. As shown in FIG. 2, the peripheral wall surface 207 faces the lens L2 from the outer side in the radial direction. The seating surface 205 faces the end surface on the image side X2 of the flange portion 14 of the lens L2 from the image side X2. The caulking portion 109 is brought into contact with the lens L2 from the object side X1 at a position overlapping the seating surface 205 when viewed from the optical axis direction X.

As shown in FIG. 10, the peripheral wall surface 207 is a tapered surface that is inclined from the seating surface 205 to the outer peripheral side toward the object side X1. The peripheral wall surface 207 includes fitting protrusions 210A to be pressure-joined to the lens L2 at a plurality of spots separated in the circumferential direction. In this Embodiment, the fitting protrusions 210A are provided at six spots in the circumferential direction at equal angular intervals. The fitting protrusion 210A includes a pressure-joining surface 210*a* parallel to the optical axis L at an end on the inner peripheral side. Further, the fitting protrusion 210A includes a curved surface 210*b* curved to the outer peripheral side from the pressure-joining surface 210*a* toward the object side X1. In the plurality of fitting protrusions 210A, the pressure-joining surface 210*a* is pressure-joined to the lens L2 accommodated in the accommodating portion 208 from the outer side in the radial direction so as to position the lens L2 in the radial direction.

As shown in FIG. 11, the image-side stepped portion 202 includes an annular image-side end surface 212 facing the object side X1, and an image-side inner-wall surface 213 extending from the end on the inner peripheral side of the image-side end surface 212 toward the image side X2. The image-side inner-wall surface 213 is a tapered surface that is inclined to the outer peripheral side toward the image side X2. As shown in FIG. 2, the image-side end surface 212 faces the image-side lens L62 of the lens L6 with a clearance therebetween in the optical axis direction X. The cover holding portion 204 is provided on the outer peripheral side of the image-side inner-wall surface 213.

As shown in FIGS. 10 and 11, the positioning stepped portion 203 includes an annular positioning surface 215 facing the object side X1, and a positioning stepped-portion peripheral-wall surface 216 extending from an end on the inner peripheral side of the positioning surface 215 toward the image side X2. On the positioning surface 215, a plurality of positioning ribs 217 that protrude toward the object side X1 and extend in an arc shape in the circumferential direction are provided. In this Embodiment, the positioning ribs 217 are provided at three spots in the circumferential direction at equal angular intervals. The lower end of the positioning stepped-portion peripheral-wall surface 216 reaches the image-side end surface 212 of the image-side end surface 212. The positioning stepped-portion peripheral-wall surface 216 is opposed to the image-side lens L62 of the lens L6 with a clearance in the radial direction.

As shown in FIG. 2, the positioning rib 217 is a positioning portion for positioning the lens L6 in the optical axis direction X by coming into contact with the flange portion 36 of the object-side lens L61 of the lens L6 from the image side X2. Here, the flange portion 36 of the object-side lens L61 of the lens L6 comes into contact with the positioning portion so that the laminated body 44 including the lens L4, the holder 28, the lens L5, and the lens L6 as well as the lens L3 are positioned in the optical axis direction X.

More specifically, the holder 28 is positioned at a predetermined position in the optical axis direction X by being supported by the lens L6 from the image side X2. The lens L4 is positioned at a predetermined position in the optical axis direction X by being supported by the holder 28 from the image side X2. The lens L5 is positioned in the optical axis direction X and the radial direction by being brought into contact with the lens L6. The lens L3 is positioned in the optical axis direction X and the radial direction by being fitted to the lens L4. Here, when the lens L5 is positioned in the optical axis direction X and the radial direction, the lens L5 and the holder 28 do not come into contact with each other. When the lens L3 and the lens L4 are positioned in the optical axis direction X and the radial direction, the lens L3 and the second lens barrel 4 do not come into contact with each other. The lens L3, the lens L4, the holder 28, and the lens L5 are positioned between the object-side stepped portion 201 and the positioning stepped portion 203 in the optical axis direction X.

As shown in FIGS. 10 and 11, on the inner peripheral surface of the second lens barrel 4, an inner peripheral-surface portion 4*a* located on the outer side in the radial direction of the object-side lens L61 of the lens L6 is a tapered surface inclined to the outer peripheral side toward the object side X1. The inner peripheral-surface portion 4*a* includes fitting protrusions 210B to be pressure-joined to the lens L6 at a plurality of spots separated in the circumferential direction. The fitting protrusions 210B are provided at six spots in the circumferential direction at equal angular intervals. The fitting protrusion 210B includes the pressure-joining surface 210*a* parallel to the optical axis L at an end on the inner peripheral side. Further, the fitting protrusion 210B includes the curved surface 210*b* curved to the outer peripheral side from the pressure-joining surface 210*a* toward the object side X1. In the plurality of fitting protrusions 210B, the pressure-joining surface 210*a* is pressure-joined to the lens L6 accommodated in the second lens barrel 4 from the outer side in the radial direction so as to position the lens L6 in the radial direction.

Further, in the inner peripheral surface of the second lens barrel 4, an inner peripheral-surface portion 4*b* located on the outer side in the radial direction of the holder 28 is a tapered surface inclined to the outer peripheral side toward the object side X1. The inner peripheral-surface portion 4*b* includes fitting protrusions 210C to be pressure-joined to the lens L6 at a plurality of spots separated in the circumferential direction. The fitting protrusions 210C are provided at six spots in the circumferential direction at equal angular intervals. The fitting protrusion 210C includes the pressure-joining surface 210*a* parallel to the optical axis L at an end on the inner peripheral side. Further, the fitting protrusion 210C includes the curved surface 210*b* curved to the outer peripheral side from the pressure-joining surface 210*a* toward the object side X1. The plurality of the fitting protrusions 210C are pressure-joined by the pressure-joining surface 210*a* to the holder 28 accommodated in the second lens barrel 4 from the outer side in the radial direction so as to position the holder 28 in the radial direction.

Further, on the inner peripheral surface of the second lens barrel 4, an inner peripheral-surface portion 4*c* located on the outer side in the radial direction of the lens L4 is a tapered surface inclined to the outer peripheral side toward the object side X1. The inner peripheral-surface portion 4*c* includes fitting protrusions 210D to be pressure-joined to the lens L4 at a plurality of spots separated in the circumferential direction. The fitting protrusions 210D are provided at six spots in the circumferential direction at equal angular intervals. The fitting protrusion 210D includes the pressure-joining surface 210*a* parallel to the optical axis L at an end on the inner peripheral side. Further, the fitting protrusion 210D includes the curved surface 210*b* curved to the outer peripheral side from the pressure-joining surface 210*a* toward the object side X1. In the plurality of fitting protrusions 210D, the pressure-joining surface 210*a* is pressure-joined to the lens L4 accommodated in the second lens barrel 4 from the outer side in the radial direction so as to position the lens L4 in the radial direction.

Further, on the inner peripheral surface of the second lens barrel 4, an inner peripheral-surface portion 4*d* located on the outer side in the radial direction of the lens L3 is a tapered surface inclined to the outer peripheral side toward the object side X1. The inner peripheral-surface portion 4*d* located on the outer side in the radial direction of the lens L3 continues to the image side X2 of the annular wall surface 206 of the object-side stepped portion 201 without a step. The inner peripheral-surface portion 4*d* includes guide protrusions 220 which guide the lens L3 in the optical axis direction X at a plurality of spots separated in the circumferential direction. The guide protrusions 220 are provided at six spots in the circumferential direction at equal angular intervals. The guide protrusion 220 includes a guide surface 220*a* parallel to the optical axis L at an end on the inner peripheral side. Further, the guide protrusion 220 includes a curved surface 220*b* curved from the pressure-joining surface 210*a* to the outer peripheral side toward the object side X1. When the lens L3 is fitted to the lens L4, the plurality of guide protrusions 220 are located on the outer side in the radial direction of the lens L3, but the plurality of guide protrusions 220 and the lens L3 do not come into contact with each other. The guide surface 220*a* of each of the guide protrusions 220 and the lens L3 are opposed to each other with a slight clearance in the radial direction.

Here, the second O-ring 8 is disposed on the object side X1 of the plurality of guide protrusions 220 and on the inner side in the radial direction of the annular wall surface 206 of the object-side stepped portion 201. As shown in FIG. 2, the second O-ring 8 is compressed in the optical axis direction X between the lens L2 accommodated in the accommodating portion 208 and the lens L3.

As shown in FIG. 11, the first inclination angle θ1 at which the tapered inner peripheral-surface portion 4*a* located on the outer side in the radial direction of the lens L6 is inclined with respect to the optical axis L is different from the second inclination angle θ2 at which the tapered inner peripheral-surface portion 4*c* located on the outer side in the radial direction of the lens L4 is inclined with respect to the optical axis L. That is, the inclination of the inner peripheral-surface portions 4*a* to 4*d* located on the outer side in the radial direction of each lens and the holder 28 can be set as appropriate in accordance with the outer diameter dimension of each lens or the holder 28. It is to be noted that, in the inner peripheral surface of the second lens barrel 4, the inner peripheral-surface portion 4*a* located between the object-side stepped portion 201 and the positioning stepped portion 203 is inclined to the outer peripheral side toward the object side X1 as a whole.

Subsequently, the second lens barrel 4 includes an annular outer peripheral-surface-side positioning surface 223 at an end part on the object side X1 of the outer peripheral surface. The outer peripheral-surface-side positioning surface 223 is located on the outer side in the radial direction of the accommodating portion 208. The outer peripheral-surface-side positioning surface 223 faces the outer side in the radial direction. Further, the second lens barrel 4 includes an outer peripheral-surface image-side stepped portion 224 on the image side X2 part of the outer peripheral surface. The outer peripheral-surface image-side stepped portion 224 includes an annular surface 225 facing the image side X2 and an outer peripheral-surface portion 226 extending from an outer peripheral end of the annular surface 225 to the object side X1. Further, the second lens barrel 4 includes an outer peripheral-surface intermediate stepped-portion 227 between an end part on the object side X1 on the outer peripheral surface (outer peripheral-surface-side positioning surface 223) and the outer peripheral-surface image-side stepped portion 224. The outer peripheral-surface intermediate stepped-portion 227 includes an annular surface 228 facing the image side X2 and an outer peripheral-surface portion 229 extending from an end on an inner peripheral side of the annular surface 228 to the image side X2.

Assembly of Lens Unit

Figure 12:
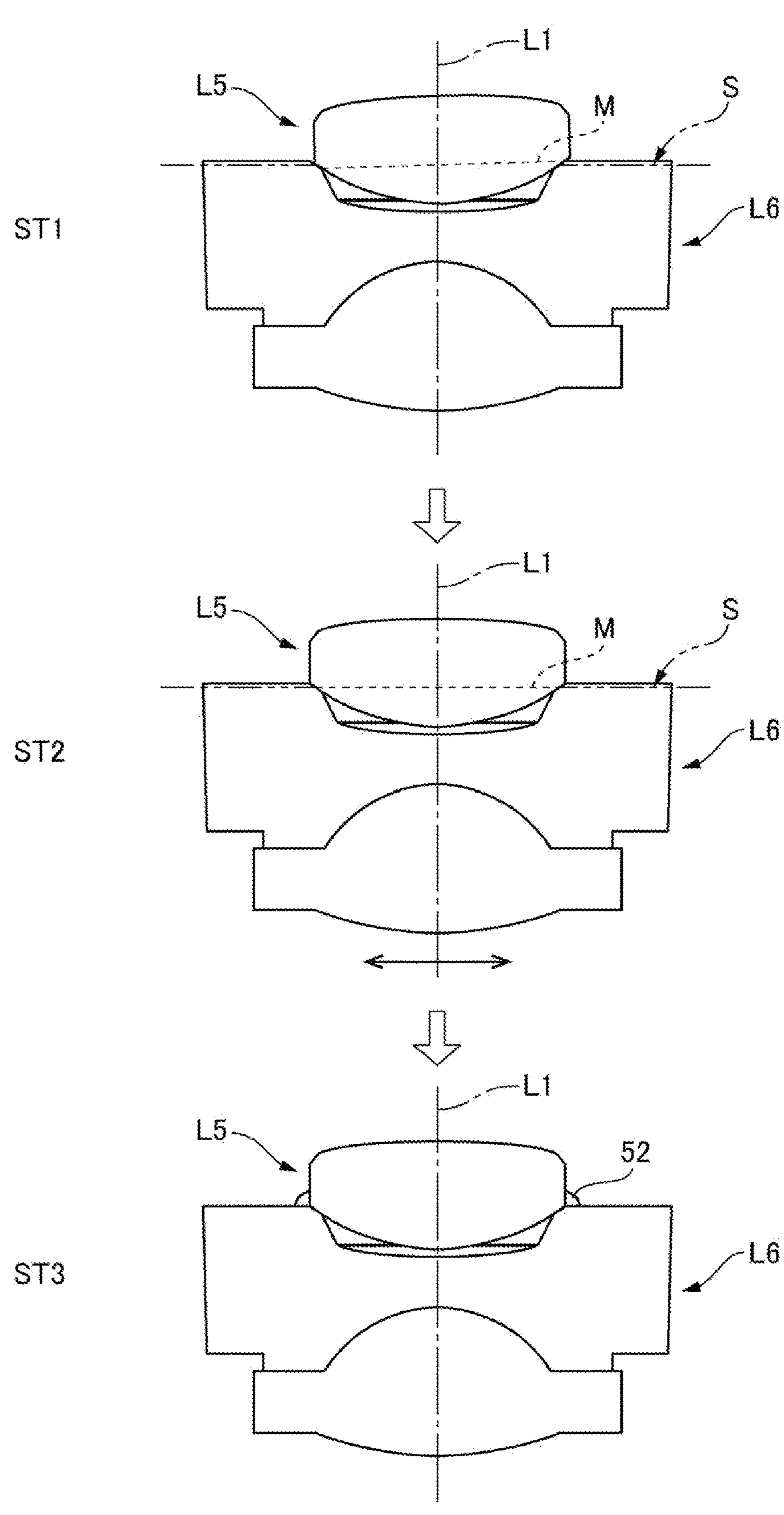
FIG. 12 is an explanatory diagram of a method of aligning the lens L6 and the lens L5.

FIG. 12 is an explanatory diagram of a method of aligning the lens L6 and the lens L5. When the lens unit 1 is to be assembled, first, a second-unit assembling operation of accommodating the lenses L2 to L6 in the second lens barrel 4 is performed. Subsequently, a lens-barrel fixing operation for holding and fixing the second lens barrel 4 to the first lens barrel 3 is performed. Thereafter, a first-unit assembling operation for accommodating the lens L1 in the first lens barrel 3 is performed.

In the second-unit assembling operation, as shown in FIG. 12, first, the lens L5 is stacked on the lens L6 outside the second lens barrel 4, and the contact portion 26 of the lens L5 and the contacted portion 37 of the lens L6 are brought into line contact with each other (Step ST1). Thereafter, the lens L6 is vibrated until the annular contact line M along which the contact portion 26 and the contacted portion 37 are in contact with each other is positioned on the virtual perpendicular plane S which is coaxial with the optical axis L and perpendicular to the optical axis L (Step ST2). Here, when the annular contact line M on which the contact portion 26 and the contacted portion 37 are in contact with each other is positioned on the virtual perpendicular plane S which is coaxial with the optical axis L and perpendicular to the optical axis L, the lens L5 and the lens L6 are aligned. That is, the lens L5 and the lens L6 are relatively positioned in the optical axis direction X and the radial direction.

After the alignment is completed, an adhesive is applied between the lens L1 and the lens L2 on the outer peripheral side of the contact line M. Further, the adhesive is cured. As a result, the lens L6 and the lens L5 are fixed by an adhesive layer 52 formed between them (Step ST3).

Subsequently, the lens L5 and the lens L6 fixed to each other are accommodated in the second lens barrel 4 from the object side X1. At this time, as can be seen from FIG. 10, the lens L6 is press-fitted into the inner peripheral side of the plurality of fitting protrusions 210B provided the closest to the image side X2 on the inner peripheral surface of the second lens barrel 4. As a result, the pressure-joining surface 210*a* of each of the fitting protrusions 210B is pressure-joined to the lens L6 (object-side lens L61) from the outer side in the radial direction, and the lens L6 is positioned in the radial direction. Further, the flange portion 36 of the object-side lens L61 of the lens L6 is brought into contact with the positioning rib 217 of the positioning stepped portion 203 of the second lens barrel 4. As a result, the lens L6 is positioned in the optical axis direction X. When the lens L6 is positioned in the optical axis direction X and the radial direction, the lens L5 fixed to the lens L6 is also positioned in the optical axis direction X and the radial direction.

Thereafter, the holder 28 is accommodated in the second lens barrel 4 from the object side X1. At this time, the holder 28 is press-fitted to the inner peripheral side of the second plurality of fitting protrusions 210C from the image side X2 on the inner peripheral surface of the second lens barrel 4. As a result, the pressure-joining surface 210*a* of each fitting protrusion 210C is pressure-joined to the holder 28 from the outer side in the radial direction, and the holder 28 is positioned in the radial direction. Further, by bringing the holder 28 into contact with the lens L6 from the object side X1, the holder 28 is supported by the lens L6 from the image side X2 and is positioned in the optical axis direction X. Here, clearances 28*a* are formed between an inner peripheral surface of the holder 28 and the lens L5. Therefore, an adhesive is dropped into these clearances 28*a* to fix the holder 28 and the lens L5 via an adhesive layer 53 (see FIG. 8). In this Embodiment, the adhesive is applied to the notch portion 31 provided in an outer peripheral portion 30 of the holder 28. As a result, the adhesive reaches the clearances 28*a* between an inner peripheral surface of the holder 28 and the lens L5 along the center portion 29.

Thereafter, the lens L4 is accommodated in the second lens barrel 4 from the object side X1. At this time, the lens L4 is press-fitted to the inner peripheral side of the third plurality of fitting protrusions 210D from the image side X2 on the inner peripheral surface of the second lens barrel 4. As a result, the pressure-joining surface 210*a* of each fitting protrusion 210D is pressure-joined to the lens L4 from the outer side in the radial direction, and the lens L4 is positioned in the radial direction. Further, by bringing the lens L4 into contact with the holder 28 from the object side X1, the lens L4 is supported by the holder 28 from the image side X2, and is positioned in the optical axis direction X. Here, the laminated body 44 constituted by the lens L4, the holder 28, the lens L5, and the lens L6 is configured inside the second lens barrel 4.

Subsequently, the lens L3 is accommodated in the second lens barrel 4 from the object side X1. At this time, the lens L3 is inserted into the inner peripheral side of the plurality of guide protrusions 220. As a result, the lens L3 is guided in the optical axis direction X in a predetermined posture, and the fitting portion 18 of the lens L3 is inserted into the fitted portion 22 of the lens L4. Further, the lens L3 guided by the guide protrusion 220 is pushed into the lens L4 from the object side X1. As a result, the fitting portion 18 of the lens L3 and the fitted portion 22 of the lens L4 are fitted to each other. In a state where the fitting portion 18 of the lens L3 and the fitted portion 22 of the lens L4 are fitted to each other, the fitting-portion tapered surface 18*a* of the fitting portion 18 and the fitted-portion tapered surface 22*a* of the fitted portion 22 are in surface contact with each other. As a result, the lens L3 is positioned with respect to the lens L4 in the radial direction. Further, in a state where the fitting portion 18 of the lens L3 and the fitted portion 22 of the lens L4 are fitted to each other, an outer peripheral-side portion of the fitting portion 18 in the flange portion 17 of the lens L3 and an outer peripheral-side portion of the fitted portion 22 in the flange portion 21 of the lens L4 come into contact with each other in the optical axis direction X. As a result, the lens L3 is brought into a state positioned in the optical axis direction X.

Thereafter, the second O-ring 8 is placed on the flange portion 17 of the lens L3 from the object side X1. Subsequently, the light shielding sheet 9 is caused to be supported by the support surface 105. Further, the lens L2 is caused to be supported by the support surface 105 via the light shielding sheet 9. At this time, the lens L2 is press-fitted to the inner peripheral side of the fitting protrusion 210A located the closest to the object side X1 on the inner peripheral surface of the second lens barrel 4. As a result, the pressure-joining surface 210*a* of each fitting protrusion 210A is pressure-joined to the lens L2 from the outer side in the radial direction, and the lens L2 is positioned in the radial direction. Further, by bringing the lens L2 into contact with the light shielding sheet 9 from the object side X1, the lens L2 is positioned in the optical axis direction X.

Thereafter, the caulking portion 109 bent to the inner peripheral side is formed at the end part on the object side X1 of the second lens barrel 4, and the caulking portion 109 is brought into contact with the outer peripheral-edge portion of the lens L2 from the object side X1. In this Embodiment, the caulking portion 109 is formed by thermal caulking. As a result, a second-unit assembling operation is completed. In a state where the second-unit assembling operation is completed, the second O-ring 8 is compressed in the optical axis direction X between the lens L2 and the lens L3.

Subsequently, a lens-barrel fixing operation for causing the second unit 60 to be held by the first unit 50 is performed. In the lens-barrel fixing operation, as can be seen from FIGS. 3 and 9, an adhesive is applied to the stepped-portion end surface 116 of each of the three intermediate stepped portions 103 provided on the inner peripheral surface of the first lens barrel 3. Thereafter, the second unit 60 is inserted into the inner peripheral side of the first lens barrel 3 from the object side X1. Then, as can be seen from FIGS. 11 and 9, the annular surface 225 of the outer peripheral-surface image-side stepped portion 224 provided on the image-side part of the outer peripheral surface of the second lens barrel 4 is brought into contact with the rib 114 (image-side positioning portion) of the image-side stepped portion 102 provided on the inner peripheral surface of the first lens barrel 3. Further, the annular outer peripheral-surface-side positioning surface 223 provided on the end part of the object side X1 of the second lens barrel 4 is brought into contact with the object-side protrusion 110 provided on the annular wall surface 106 of the object-side stepped portion 101 of the first lens barrel 3.

Here, the inner peripheral surface of the first lens barrel 3 and the outer peripheral surface of the second lens barrel 4 are opposed to each other with a clearance except for a contact portion between the image-side stepped portion 102 of the second lens barrel 4 and the image-side stepped portion 102 of the first lens barrel 3 and a contact portion between the annular positioning surface 215 of the second lens barrel 4 and the object-side stepped portion 101 of the first lens barrel 3. Therefore, the second lens barrel 4 is positioned in the optical axis direction X and the radial direction with respect to the first lens barrel 3 by the two contact portions.

Further, when the second unit 60 is inserted into the inner peripheral side of the first lens barrel 3, the intermediate stepped portion 103 of the inner peripheral surface of the first lens barrel 3 and the outer peripheral-surface intermediate stepped-portion 227 of the outer peripheral surface of the second lens barrel 4 face each other with a clearance therebetween. That is, the stepped-portion end surface 116 of the intermediate stepped portion 103 of the first lens barrel 3 and the annular surface 228 of the outer peripheral-surface intermediate stepped-portion 227 of the second lens barrel 4 face each other with a clearance therebetween in the optical axis direction X. Further, the stepped-portion wall surface 117 of the intermediate stepped portion 103 of the first lens barrel 3 and the outer peripheral-surface portion 229 of the outer peripheral-surface intermediate stepped-portion 227 of the second lens barrel 4 face each other with a clearance in the radial direction. Here, the adhesive applied to the stepped-portion end surface 116 of the intermediate stepped portion 103 of the first lens barrel 3 spreads to the stepped-portion wall surface 117 when the second unit 60 is inserted into the inner peripheral side of the first lens barrel 3. Therefore, as shown in FIG. 2, the lens-barrel connecting adhesive-layer 51 is interposed between the stepped-portion end surface 116 of the intermediate stepped portion 103 of the first lens barrel 3 and the annular surface 228 of the outer peripheral-surface intermediate stepped-portion 227 of the second lens barrel 4. Further, the lens-barrel connecting adhesive-layer 51 is interposed between the stepped-portion wall surface 117 of the intermediate stepped portion 103 of the first lens barrel 3 and an outer peripheral-surface portion 229 of the outer peripheral-surface intermediate stepped-portion 227 of the second lens barrel 4. The intermediate stepped portion 103 of the first lens barrel 3 and the outer peripheral-surface intermediate stepped-portion 227 of the second lens barrel 4 are adhesive fixing portions that connect the first lens barrel 3 and the second lens barrel 4 via the lens-barrel connecting adhesive-layer 51.

Subsequently, in the first-unit assembly operation, the first O-ring 7 is placed on the support surface 105 of the first lens barrel 3. Thereafter, the lens L1 is caused to be supported by the support surface 105 via the first O-ring 7. Thereafter, the caulking portion 109 bent to the inner peripheral side is formed at the end part of the object side X1 of the first lens barrel 3. As a result, the caulking portion 109 is brought into contact with the outer peripheral-edge portion of the lens L1 from the object side X1. In this Embodiment, the caulking portion 109 is formed by thermal caulking. When the caulking portion 109 is formed, the first O-ring 7 is compressed in the optical axis direction X between the end surface on the image side X2 of the lens L1 and the support surface 105 of the first lens barrel 3.

Here, when the lens L1 is held by the first lens barrel 3, the annular protrusion 15 provided on the flange portion 14 of the lens L2 held by the second lens barrel 4 is in surface contact with the end surface 11 on the image side X2 of the lens L2.

Further, as shown in FIG. 2, between the first lens barrel 3 and the second lens barrel 4, an air passage 70 is formed from between an end 3*a* on the image side X2 of the first lens barrel 3 and an end 4*e* on the image side X2 of the second lens barrel 4 via between the ribs 114 adjacent to each other in the circumferential direction in the image-side stepped portion 102 of the first lens barrel 3, the notch groove 118 provided in the intermediate stepped portion 103 of the first lens barrel 3, and between the object-side protrusions 110 adjacent to each other in the circumferential direction on the annular wall surface 106 of the object-side stepped portion 101 of the first lens barrel 3. The air passage 70 communicates with a space between the lens L1 and the support surface 105 and closer to the inner peripheral side than the first O-ring 7.

Operation and Effect

The lens unit 1 of this Embodiment includes a lens L1 (first lens) and a lens L2 (second lens) disposed in an order from an object side X1 to an image side X2, a first lens barrel 3 including an annular accommodating portion 108 which accommodates an outer peripheral-edge portion of the lens L1, a second lens barrel 4 which accommodates the lens L2 and is held on an inner peripheral side of the first lens barrel 3, and a first O-ring 7. The lens L1 includes an end surface 11 facing the image side X2 on the outer peripheral side of the lens surface. The accommodating portion 108 is located on the outer peripheral side of the second lens barrel 4. The accommodating portion 108 includes a peripheral wall surface 107 facing the lens L1 from the outer side in the radial direction, a support surface 105 extending from an end on the image side X2 of the peripheral wall surface 107 to the inner peripheral side and facing the end surface 11 from the image side X2, and a caulking portion 109 brought into contact with the lens L1 from the object side X1 at a position overlapping the support surface 105 when viewed from the optical axis direction X. The lens L2 includes an annular contact portion 15*a* which is in surface contact with the end surface 11 of the lens L1 on the inner peripheral side of the support surface 105. The first O-ring 7 is compressed between the lens L1 and the support surface 105.

According to this Embodiment, the first O-ring 7 is disposed in a compressed state between the lens L1 and the support surface 105 of the accommodating portion 108 of the lens L1 in the first lens barrel 3. As a result, in the lens unit 1, intrusion of water or the like into the space between the lens L1 and the lens L2 through a space between the inner wall surface of the first lens barrel 3 and the lens L1 from the object side X1 can be prevented. Further, the lens L2 held by the second lens barrel 4 includes the annular contact portion 15*a* which is in surface contact with the end surface 11 of the lens L1 accommodated in the first lens barrel 3. Therefore, even if the first lens L1 and the second lens L2 are held in different lens barrels 2, intrusion of water vapor into the space between the lens L1 and the lens L2 can be prevented. Thus, occurrence of fogging on a lens surface on the image side X2 of the lens L1 and a lens surface on the object side X1 of the lens L2 can be prevented or suppressed.

In this Embodiment, the first O-ring 7 is compressed in the optical axis direction X between the end surface 11 of the lens L1 and the support surface 105. As a result, the first O-ring 7 can liquid-tightly seal a space between the end surface 11 of the lens L1 and the support surface 105 of the first lens barrel 3. Further, when the first O-ring 7 is compressed in the optical axis direction X, the first O-ring 7 urges the lens L1 toward the caulking portion 109. As a result, since formation of a gap between the lens L1 and the caulking portion 109 is suppressed, intrusion into the space between the lens L1 and the lens L2 from the object side X1 through the space between the inner wall surface of the first lens barrel 3 and the lens L1 can be prevented more easily.

In this Embodiment, the lens L3 (third lens) disposed on the image side X2 of the lens L2 and a second O-ring 8 disposed between the lens L2 and the lens L3 are provided. The second lens barrel 4 accommodates the lens L3 and the second O-ring 8. The second lens barrel 4 includes an annular caulking portion 209 which is bent from the distal end part of the object side X1 to the inner peripheral side and is brought into contact with the outer peripheral-edge portion of the lens L2 from the object side X1, and includes an object-side stepped portion 201 (first stepped portion) on the inner peripheral surface. The object-side stepped portion 201 includes an annular seating surface 205 (first seating surface) facing the object side X1 at a position overlapping the caulking portion 109 when viewed from the optical axis direction X and an annular wall surface 206 (inner peripheral-surface portion) extending from an end on the inner peripheral side of the seating surface 205 to the image side X2. The outer peripheral-edge portion of the lens L2 is located between the caulking portion 109 and the seating surface 205. The lens L3 is supported from the image side X2 at a predetermined position in the optical axis direction X by the laminated body 44. The second O-ring 8 is compressed in the optical axis direction X at a position adjacent to the annular wall surface 206 in the radial direction and exerts an urging force to urge the lens L3 toward the object side X1 and to urge the lens L3 toward the image side X2. Therefore, even when the caulking portion 209 provided on the second lens barrel 4 lifts on the object side X1, the state where the lens L2 is in contact with the caulking portion 209 is maintained by the urging force of the second O-ring 8. Further, the urging force of the second O-ring 8 maintains a state in which the annular contact portion 15*a* of the lens L2 held by the second lens barrel 4 is in surface contact with the end surface 11 of the lens L1 accommodated in the first lens barrel 3. Thus, even if the lens L1 and the lens L2 are held in the different lens barrels 2, intrusion of water vapor into the space between the lens L1 and the lens L2 can be prevented.

In this Embodiment, a laminated body 44 including a plurality of lenses laminated in the optical axis direction X is provided. The second lens barrel 4 includes a positioning stepped portion 203 (first stepped portion) closer to the image side X2 than the object-side stepped portion 201 on the inner peripheral surface. The positioning stepped portion 203 includes a positioning rib 217 (second seating surface) provided on a positioning surface 215 facing the object side X1. The laminated body 44 is accommodated in the second lens barrel 2 in a state of being placed on the positioning rib 217. The lens L3 is laminated on the object side X1 of the laminated body 44 and is supported from the image side X2 by the laminated body 44. The lens L2 is laminated on the object side X1 of the lens L3 and is supported at a predetermined position in the optical axis direction X. When viewed from the optical axis direction X, the first O-ring 7 and the positioning rib 217 overlap each other. The laminated body 44 is constituted by a lens L4, a holder 28, a lens L5, and a lens L6. Therefore, it is easy to press the laminated body 44 against the positioning rib 217 via the third lens by the urging force of the second O-ring 8.

In this Embodiment, between the inner peripheral surface of the first lens barrel 3 and the outer peripheral surface of the second lens barrel 4, an air passage 70 which communicates from a space between the end on the image side X2 of the first lens barrel 3 and the end on the image side X2 of the second lens barrel 4 to a space between the lens L1 and the support surface 105 and closer to the inner peripheral side of the first O-ring 7 is provided. In this Embodiment, between the first lens barrel 3 and the second lens barrel 4, the air passage 70 which communicates from a space between the end on the image side X2 of the first lens barrel 3 and the end on the image side X2 of the second lens barrel 4 via a space between the ribs 114 adjacent to each other in the circumferential direction, a notch groove 118, and a space between the object-side protrusions 110 adjacent to each other in the circumferential direction to a space between the lens L1 and the support surface 105 and closer to a space on the inner peripheral side than the first O-ring 7 is formed. Therefore, after the assembly of the lens unit 1 is completed, by blowing air from a space between the end on the image side X2 of the first lens barrel 3 and the end on the image side X2 of the second lens barrel 4, it is possible to check whether or not the space between the outer peripheral-end portion of the lens L1 and the support surface 105 is liquid-tightly sealed by the first O-ring 7.

Variation

Figure 13:
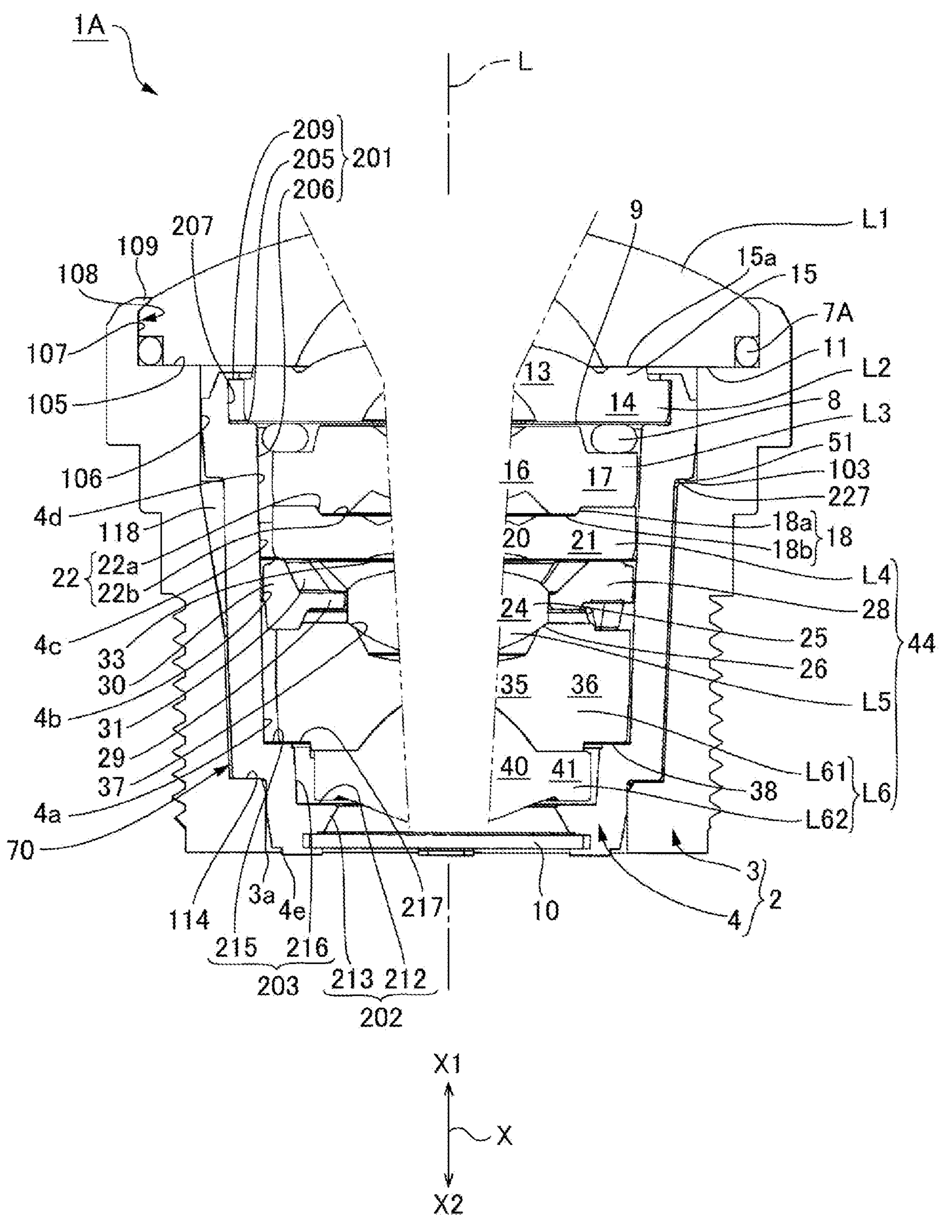
FIG. 13 is a sectional view of a lens unit of a modification.

FIG. 13 is a cross-sectional view of the lens unit of a variation. A lens unit 1A of the variation has a configuration corresponding to that of the lens unit 1. Therefore, in the following, the same signs are given to the corresponding configurations, and description thereof will be omitted.

As shown in FIG. 13, the lens unit 1A of this Embodiment has a lens L1 (first lens) and a lens L2 (second lens) disposed in order from the object side X1 to the image side X2, a first lens barrel 3 including an annular accommodating portion 108 which accommodates the outer peripheral-edge portion of the lens L1, a second lens barrel 4 which accommodates the lens L2 and held on the inner peripheral side of the first lens barrel 3, and a first O-ring 7A. The lens L1 has an end surface 11 facing the image side X2 on the outer peripheral side of the lens surface. The accommodating portion 108 is located on the outer peripheral side of the second lens barrel 4. The accommodating portion 108 includes a peripheral wall surface 107 facing the lens L1 from the outer side in the radial direction, a support surface 105 extending from an end on the image side X2 of the peripheral wall surface 107 to the inner peripheral side and facing the end surface 11 from the image side X2, and a caulking portion 109 brought into contact with the lens L1 from the object side X1 at a position overlapping the support surface 105 when viewed from the optical axis direction X. The lens L2 includes an annular contact portion 15*a* which is in surface contact with the end surface 11 of the lens L1 on the inner peripheral side of the support surface 105. The first O-ring 7 is compressed in the radial direction between the lens L1 and the peripheral wall surface 107.

That is, in this Embodiment, the lens L1 includes an annular notch portion which is cut out from the outer peripheral side in the outer peripheral-edge portion of the end surface 11 on the image side X2. The first O-ring 7 is attached to the annular notch portion. When the lens L1 is to be accommodated in the accommodating portion 108, the lens L1 is placed on the support surface 105. As a result, the end surface 11 of the lens L1 comes into contact with the support surface 105. Further, when the lens L1 is to be accommodated in the accommodating portion 108, the first O-ring 7 is compressed in the radial direction between the lens L1 and the peripheral wall surface 107.

In this Embodiment, too, the lens unit 1A can prevent intrusion of water or the like into the space between the lens L1 and the lens L2 from the object side x1 via the space between the inner peripheral wall of the first lens barrel 3 and the lens L1. Further, the lens L2 held by the second lens barrel 4 includes an annular contact portion 15*a* which is in surface contact with the end surface 11 of the lens L1 accommodated in the first lens barrel 3. Therefore, even if the lens L1 and the lens L2 are held in different lens barrels 2, intrusion of water vapor into the space between the lens L1 and the lens L2 can be prevented. Thus, occurrence of fogging on a lens surface on the image side X2 of the lens L1 and a lens surface on the object side X1 of the lens L2 can be prevented or suppressed.

It is to be noted that the present art can be configured as follows.

(1) A lens unit having a first lens and a second lens disposed in order from an object side to an image side, a first lens barrel including an annular accommodating portion which accommodates an outer peripheral-edge portion of the first lens, a second lens barrel which accommodates the second lens and is held on an inner peripheral side of the first lens barrel, and a first O-ring, in which the first lens has an end surface facing the image side on an outer peripheral side of a lens surface, the accommodating portion includes a peripheral wall surface located on an outer peripheral side of the second lens barrel and facing the first lens from an outer side in a radial direction, a support surface extending from an end on the image side of the peripheral wall surface to an inner peripheral side and facing the end surface from the image side, and a caulking portion which is brought into contact with the first lens from an object side at a position overlapping the support surface when viewed from an optical axis direction along an optical axis of the first lens, the second lens includes an annular contact portion which is in surface contact with the end surface of the first lens on an inner peripheral side of the support surface, and the first O-ring is compressed between the first lens and the peripheral wall surface or between the first lens and the support surface.

(2) The lens unit described in (1), in which the first O-ring is compressed in the optical axis direction between the end surface and the support surface.

(3) The lens unit described in (2), having a third lens disposed on the image side of the second lens and a second O-ring disposed between the second lens and the third lens, in which the second lens barrel accommodates the third lens and the second O-ring, includes an annular second caulking portion which is bent from a distal end part on the object side to an inner peripheral side and is brought into contact with an outer peripheral-edge portion of the second lens from the object side, and includes a first stepped portion on an inner peripheral surface, the first stepped portion includes an annular first seating surface facing the object side at a position overlapping the caulking portion when viewed from the optical axis direction and an inner peripheral-surface portion extending from an end on an inner peripheral side of the annular first seating surface to the image side, the outer peripheral-edge portion of the second lens is located between the caulking portion and the annular first seating surface, the third lens is supported from the image side at a predetermined position in the optical axis direction, and the second O-ring is compressed in the optical axis direction at a position adjacent to the inner peripheral-surface portion in the radial direction and exerts an urging force to urge the third lens toward the object side and to urge the third lens toward the image side.

(4) The lens unit described in (3) characterized by having a laminated body including a plurality of lenses laminated in the optical axis direction, in which the second lens barrel includes a second stepped portion closer to an image side than the first stepped portion on an inner peripheral surface, the second stepped portion includes a second seating surface facing the object side, the laminated body is accommodated in the lens barrel in a state of being placed on the second seating surface, the third lens is laminated on the object side of the laminated body and is supported from the image side by the laminated body, the second lens is laminated on the object side of the third lens and is supported at a predetermined position in the optical axis direction, and the second O-ring and the second seating surface overlap each other when viewed from the optical axis direction.

(5) The lens unit described in any one of (1) to (4), characterized in that, between an inner peripheral surface of the first lens barrel and an outer peripheral surface of the second lens barrel, an air passage communicating from a space between an end on the image side of the first lens barrel and an end on the image side of the second lens barrel to a space between the first lens and the support surface and closer to an inner peripheral side than the first O-ring is provided.

What is claimed is:

1. A lens unit comprising:

a first lens and a second lens disposed in order from an object side to an image side;

a first lens barrel comprising an annular accommodating portion which accommodates an outer peripheral-edge portion of the first lens;

a second lens barrel which accommodates a second lens and is held on an inner peripheral side of the first lens barrel;

a third lens disposed on the image side of the second lens;

a first O-ring;

a second O-ring disposed between the second lens and the third lens; and a laminated body comprising a plurality of lenses laminated in an optical axis direction along an optical axis of the first lens, the laminated body being accommodated in the second lens barrel, wherein the first lens has an end surface facing the image side on an outer peripheral side of a lens surface;

the accommodating portion comprises a peripheral wall surface located on an outer peripheral side of the second lens barrel and facing the first lens from an outer side in a radial direction, a support surface extending from an end on the image side of the peripheral wall surface to an inner peripheral side and facing the end surface from the image side, and a caulking portion which is brought into contact with the first lens from the object side at a position overlapping the support surface when viewed from the optical axis direction;

the second lens comprises an annular contact portion which is in surface contact with the end surface of the first lens on an inner peripheral side of the support surface;

the first O-ring is compressed between the first lens and the peripheral wall surface or between the first lens and the support surface;

the second lens barrel accommodates the third lens and the second O-ring, comprises an annular second caulking portion which is bent from a distal end part on the object side to an inner peripheral side and is brought into contact with an outer peripheral-edge portion of the second lens from the object side, and comprises a first stepped portion on an inner peripheral surface;

the first stepped portion comprises an annular first seating surface facing the object side at a position overlapping the caulking portion when viewed from the optical axis direction and an inner peripheral-surface portion extending from an end on an inner peripheral side of the annular first seating surface to the image side;

the outer peripheral-edge portion of the second lens is located between the caulking portion and the annular first seating surface;

the third lens is laminated on the object side of the laminated body and is supported from the image side by the laminated body; and the second O-ring is compressed in the optical axis direction at a position adjacent to the inner peripheral-surface portion in the radial direction and exerts an urging force to urge the third lens toward the object side and to urge the third lens toward the image side.

2. The lens unit according to claim 1, wherein the first O-ring is compressed in the optical axis direction between the end surface and the support surface.

3. The lens unit according to claim 1, wherein the second lens barrel comprises a second stepped portion closer to an image side than the first stepped portion on the inner peripheral surface;

the second stepped portion comprises a second seating surface facing the object side;

the laminated body is accommodated in the second lens barrel in a state of being placed on the second seating surface;

the second lens is laminated on the object side of the third lens and is supported by the third lens and the second O-ring in the optical axis direction; and the second O-ring and the second seating surface overlap each other when viewed from the optical axis direction.

4. The lens unit according to claim 1, wherein, between an inner peripheral surface of the first lens barrel and an outer peripheral surface of the second lens barrel, an air passage communicating from a space between an end on the image side of the first lens barrel and an end on the image side of the second lens barrel to a space between the first lens and the support surface and closer to an inner peripheral side than the first O-ring is provided.

5. The lens unit according to claim 3, wherein, between an inner peripheral surface of the first lens barrel and an outer peripheral surface of the second lens barrel, an air passage communicating from a space between an end on the image side of the first lens barrel and an end on the image side of the second lens barrel to a space between the first lens and the support surface and closer to an inner peripheral side than the first O-ring is provided.

* * * * *